US007278218B2

(12) United States Patent
Levine

(10) Patent No.: US 7,278,218 B2
(45) Date of Patent: Oct. 9, 2007

(54) LASER LINE GENERATING DEVICE WITH SWIVEL BASE

(75) Inventor: Steven R. Levine, Mooresville, NC (US)

(73) Assignee: Irwin Industrial Tool Company, Freeport, IL (US)

( * ) Notice: Subject to any disclaimer, the term of this patent is extended or adjusted under 35 U.S.C. 154(b) by 50 days.

(21) Appl. No.: 10/612,035

(22) Filed: Jul. 1, 2003

(65) Prior Publication Data

US 2004/0258126 A1    Dec. 23, 2004

Related U.S. Application Data

(63) Continuation of application No. 10/465,534, filed on Jun. 18, 2003, now abandoned.

(51) Int. Cl.
*G01C 15/00* (2006.01)
(52) U.S. Cl. ............... 33/286; 33/DIG. 21; 33/347; 33/370; 248/183.2
(58) Field of Classification Search ........... 33/286, 33/DIG. 21, 285, 227, 228, 1 N, 1 D, 281, 33/282, 283, 354, 347, 370, 371, 372, 373, 33/374, 375, 376; 248/542, 683, 558, 458, 248/467, 130, 131, 425, 429, 371, 349.1, 248/943, 183.2
See application file for complete search history.

(56) References Cited

U.S. PATENT DOCUMENTS

| 1,153,760 A | 9/1915 | Butler |
| 1,308,809 A | 7/1919 | Reese |
| 1,657,546 A * | 1/1928 | Patton ..................... 33/388 |
| 2,431,491 A | 11/1947 | Lee et al. |
| 2,759,696 A | 8/1956 | Nelson |
| 3,576,409 A | 4/1971 | Fiddler |
| 3,628,874 A | 12/1971 | Tagnon |
| 3,635,565 A | 1/1972 | Colson |
| 3,713,614 A | 1/1973 | Taylor |
| 3,820,903 A | 6/1974 | Kindl et al. |
| 3,847,703 A | 11/1974 | Kaiser |
| 3,897,637 A | 8/1975 | Genho |
| 3,959,888 A * | 6/1976 | Baker et al. .................. 33/282 |
| 3,964,824 A | 6/1976 | Dixon |

(Continued)

FOREIGN PATENT DOCUMENTS

DE      3246359      6/1984

(Continued)

OTHER PUBLICATIONS

Annex to Form PCT/ISA/206, Communication Relating to the Results of the Partial International Search in Application No. PCT/US2004/018724.

(Continued)

*Primary Examiner*—G. Bradley Bennett
*Assistant Examiner*—Amy R. Cohen
(74) *Attorney, Agent, or Firm*—Marshall Gerstein & Borun LLP

(57) ABSTRACT

A base for a light generating device or a leveling device, having a first surface that includes a connection structure to receive and mount either a light generating device or a leveling device thereto, and a second surface including a nonmechanical attachment structure.

59 Claims, 15 Drawing Sheets

U.S. PATENT DOCUMENTS

| | | | |
|---|---|---|---|
| 4,068,961 A * | 1/1978 | Ebner et al. ................... | 403/55 |
| 4,099,118 A | 7/1978 | Franklin et al. | |
| 4,111,564 A | 9/1978 | Trice | |
| 4,208,802 A * | 6/1980 | Berndt ......................... | 33/347 |
| 4,221,483 A | 9/1980 | Rando | |
| 4,310,797 A | 1/1982 | Butler | |
| 4,439,927 A | 4/1984 | Elliott | |
| 4,464,622 A | 8/1984 | Franklin | |
| 4,663,856 A * | 5/1987 | Hall et al. ..................... | 33/373 |
| 4,700,489 A | 10/1987 | Vasile | |
| 4,751,782 A | 6/1988 | Ammann | |
| 4,766,673 A | 8/1988 | Bolson | |
| 4,829,676 A * | 5/1989 | Waldron ........................ | 33/372 |
| 4,852,265 A | 8/1989 | Rando et al. | |
| 4,853,617 A | 8/1989 | Douglas et al. | |
| 4,854,704 A | 8/1989 | Funazaki et al. | |
| 4,859,931 A | 8/1989 | Yamashita et al. | |
| 4,912,851 A | 4/1990 | Rando et al. | |
| 4,988,192 A | 1/1991 | Knittel | |
| 4,992,741 A | 2/1991 | Douglas et al. | |
| 4,993,161 A | 2/1991 | Borkovitz | |
| 5,033,848 A | 7/1991 | Hart et al. | |
| 5,063,679 A * | 11/1991 | Schwandt ..................... | 33/347 |
| 5,075,977 A | 12/1991 | Rando | |
| 5,108,177 A | 4/1992 | Middleton | |
| 5,144,487 A | 9/1992 | Hersey | |
| 5,148,108 A | 9/1992 | Dufour | |
| 5,182,863 A | 2/1993 | Rando | |
| 5,208,438 A | 5/1993 | Underberg | |
| D339,074 S | 9/1993 | Dufour | |
| 5,243,398 A | 9/1993 | Nielsen | |
| 5,264,670 A | 11/1993 | Leonard | |
| 5,287,365 A | 2/1994 | Nielsen et al. | |
| 5,287,627 A | 2/1994 | Rando | |
| 5,317,253 A | 5/1994 | Kronberg | |
| 5,367,779 A | 11/1994 | Lee | |
| 5,394,616 A | 3/1995 | Claxton | |
| 5,400,514 A | 3/1995 | Imbrie et al. | |
| 5,457,394 A | 10/1995 | McEwan | |
| 5,459,932 A | 10/1995 | Rando et al. | |
| 5,481,809 A | 1/1996 | Rooney | |
| 5,485,266 A | 1/1996 | Hirano et al. | |
| 5,516,581 A * | 5/1996 | Kreckel et al. ........... | 428/317.3 |
| 5,524,352 A | 6/1996 | Rando et al. | |
| 5,531,031 A * | 7/1996 | Green ......................... | 33/365 |
| 5,533,268 A | 7/1996 | Keightley | |
| 5,539,990 A | 7/1996 | Le | |
| 5,541,727 A | 7/1996 | Rando et al. | |
| 5,552,886 A | 9/1996 | Kitajima et al. | |
| 5,555,137 A | 9/1996 | Whiting | |
| 5,572,796 A | 11/1996 | Breda | |
| 5,572,797 A | 11/1996 | Chase | |
| 5,575,073 A * | 11/1996 | von Wedemayer ........... | 33/365 |
| 5,584,458 A | 12/1996 | Rando | |
| 5,594,993 A | 1/1997 | Tager et al. | |
| 5,604,987 A | 2/1997 | Cupp | |
| 5,606,802 A | 3/1997 | Ogawa | |
| 5,610,711 A | 3/1997 | Rando | |
| 5,617,202 A | 4/1997 | Rando | |
| 5,619,128 A | 4/1997 | Heger | |
| 5,619,802 A | 4/1997 | Rando et al. | |
| 5,621,975 A | 4/1997 | Rando | |
| D382,255 S | 8/1997 | Moffatt | |
| 5,655,307 A | 8/1997 | Ogawa et al. | |
| 5,666,736 A | 9/1997 | Wen | |
| 5,680,208 A | 10/1997 | Butler et al. | |
| 5,689,330 A | 11/1997 | Gerard et al. | |
| 5,742,387 A | 4/1998 | Ammann | |
| 5,754,287 A | 5/1998 | Clarke | |
| 5,754,582 A | 5/1998 | Dong | |
| 5,777,899 A | 7/1998 | Kumagai | |
| 5,782,003 A | 7/1998 | Bozzo | |
| 5,790,248 A | 8/1998 | Ammann | |
| 5,819,424 A | 10/1998 | Ohtomo et al. | |
| 5,832,867 A * | 11/1998 | Whicker, Jr. ................ | 116/209 |
| 5,836,081 A | 11/1998 | Orosz | |
| 5,839,199 A | 11/1998 | Ogawa | |
| 5,852,493 A | 12/1998 | Monnin | |
| 5,864,956 A | 2/1999 | Dong | |
| 5,872,657 A | 2/1999 | Rando | |
| 5,900,931 A | 5/1999 | Rando | |
| 5,903,345 A | 5/1999 | Butler et al. | |
| 5,907,907 A | 6/1999 | Ohtomo et al. | |
| 5,917,587 A | 6/1999 | Rando | |
| D412,674 S | 8/1999 | Kaiser | |
| 5,946,087 A | 8/1999 | Kasori et al. | |
| 5,966,826 A * | 10/1999 | Ho ............................. | 33/365 |
| 5,967,645 A | 10/1999 | Anderson | |
| 5,983,510 A | 11/1999 | Wu et al. | |
| 5,992,029 A | 11/1999 | Dong | |
| 5,994,688 A | 11/1999 | Jackson et al. | |
| 6,000,813 A | 12/1999 | Krietzman | |
| 6,005,716 A | 12/1999 | Ligtenberg et al. | |
| 6,005,719 A | 12/1999 | Rando | |
| 6,009,630 A | 1/2000 | Rando | |
| 6,012,229 A | 1/2000 | Shiao | |
| 6,014,211 A | 1/2000 | Middleton et al. | |
| 6,028,665 A | 2/2000 | McQueen | |
| 6,035,540 A | 3/2000 | Wu et al. | |
| 6,037,874 A | 3/2000 | Heironimus | |
| 6,043,879 A | 3/2000 | Dong | |
| 6,065,217 A | 5/2000 | Dong | |
| 6,067,152 A | 5/2000 | Rando | |
| 6,073,353 A | 6/2000 | Ohtomo et al. | |
| 6,073,354 A | 6/2000 | Rando | |
| 6,082,013 A | 7/2000 | Peterhans | |
| 6,082,875 A | 7/2000 | Kousek | |
| 6,101,728 A | 8/2000 | Keng | |
| 6,104,479 A | 8/2000 | Ohtomo et al. | |
| 6,133,996 A * | 10/2000 | Plumb et al. ................ | 356/138 |
| 6,163,969 A | 12/2000 | Jan et al. | |
| 6,167,630 B1 * | 1/2001 | Webb .......................... | 33/354 |
| 6,178,649 B1 | 1/2001 | Wu | |
| 6,195,902 B1 | 3/2001 | Jan et al. | |
| 6,202,312 B1 | 3/2001 | Rando | |
| 6,209,219 B1 | 4/2001 | Wakefield et al. | |
| 6,211,662 B1 | 4/2001 | Bijawat et al. | |
| 6,215,293 B1 | 4/2001 | Yim | |
| 6,249,113 B1 | 6/2001 | Krantz et al. | |
| 6,249,983 B1 * | 6/2001 | Wright et al. ................. | 33/286 |
| 6,255,552 B1 | 7/2001 | Cummings et al. | |
| 6,259,241 B1 | 7/2001 | Krantz | |
| 6,301,997 B1 | 10/2001 | Welte | |
| 6,313,912 B1 | 11/2001 | Piske et al. | |
| 6,351,890 B1 | 3/2002 | Williams | |
| 6,360,446 B1 | 3/2002 | Bijawat et al. | |
| 6,363,622 B1 | 4/2002 | Stratton | |
| 6,384,420 B1 | 5/2002 | Bozzo | |
| 6,384,913 B1 | 5/2002 | Douglas et al. | |
| 6,427,347 B1 | 8/2002 | Butler | |
| 6,449,856 B1 | 9/2002 | Matsumoto et al. | |
| 6,452,097 B1 | 9/2002 | DeWall | |
| 6,493,952 B1 | 12/2002 | Kousek et al. | |
| 6,493,955 B1 | 12/2002 | Moretti | |
| 6,499,707 B2 * | 12/2002 | Hamerski et al. ........ | 248/205.3 |
| D469,556 S | 1/2003 | Malard et al. | |
| 6,502,319 B1 | 1/2003 | Goodrich et al. | |
| D470,423 S | 2/2003 | Loudenslager et al. | |
| 6,513,954 B2 | 2/2003 | Ebersole | |
| 6,532,676 B2 | 3/2003 | Cunningham | |
| 6,536,122 B2 | 3/2003 | Tamamura | |
| 6,542,304 B2 | 4/2003 | Tacklind et al. | |
| 6,546,636 B2 | 4/2003 | Tamamura | |
| 6,568,094 B2 | 5/2003 | Wu | |

| | | | |
|---|---|---|---|
| 6,569,521 B1 * | 5/2003 | Sheridan et al. ............ 428/343 | |
| 6,604,291 B2 | 8/2003 | Waibel et al. | |
| 6,606,798 B2 | 8/2003 | El-Katcha et al. | |
| 6,625,895 B2 | 9/2003 | Tacklind et al. | |
| 6,688,011 B2 | 2/2004 | Gamal et al. | |
| 6,782,034 B2 * | 8/2004 | Li ............................. 372/109 | |
| 6,810,598 B2 * | 11/2004 | Boys ............................ 33/528 | |
| 7,013,570 B2 * | 3/2006 | Levine et al. ................. 33/286 | |
| 7,055,252 B2 * | 6/2006 | Wu ............................. 33/286 | |
| 2001/0007420 A1 | 7/2001 | Bijawat et al. | |
| 2001/0029675 A1 | 10/2001 | Webb | |
| 2001/0034944 A1 | 11/2001 | Cunningham | |
| 2002/0036768 A1 | 3/2002 | Feist et al. | |
| 2002/0162233 A1 | 11/2002 | El-Katcha et al. | |
| 2002/0178596 A1 | 12/2002 | Malard et al. | |
| 2003/0061720 A1 | 4/2003 | Waibel | |
| 2003/0101605 A1 | 6/2003 | Tacklind et al. | |
| 2003/0101606 A1 | 6/2003 | Li | |
| 2003/0106226 A1 | 6/2003 | Tacklind et al. | |
| 2003/0145474 A1 | 8/2003 | Tacklind et al. | |
| 2003/0177652 A1 | 9/2003 | Sawaguchi | |
| 2003/0229997 A1 | 12/2003 | Gamal et al. | |
| 2003/0231303 A1 | 12/2003 | Raskin et al. | |
| 2004/0031163 A1 | 2/2004 | El-Katcha et al. | |

FOREIGN PATENT DOCUMENTS

| | | |
|---|---|---|
| GB | 2 131 908 A | 6/1984 |
| GB | 2345541 | 7/2000 |
| WO | WO 98/51994 | 11/1998 |
| WO | WO-98/58232 | 12/1998 |
| WO | WO-2004/113985 | 12/2004 |

OTHER PUBLICATIONS

International Search Report in Application No. PCT/US2004/018724, dated May. 9, 2005.

Written Opinion of the International Searching Authority in Application No. PCT/US2004/018724, dated May 9, 2005.

United Kingdom Search Report for United Kingdom Patent Application No. 0514904.2., dated Nov. 9, 2005.

* cited by examiner

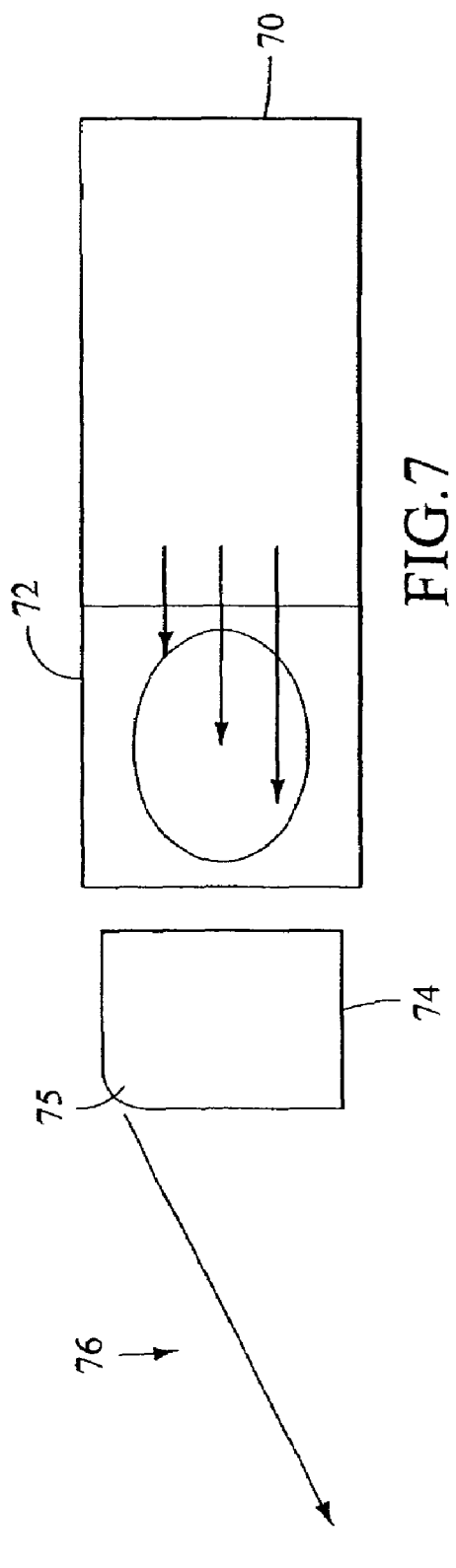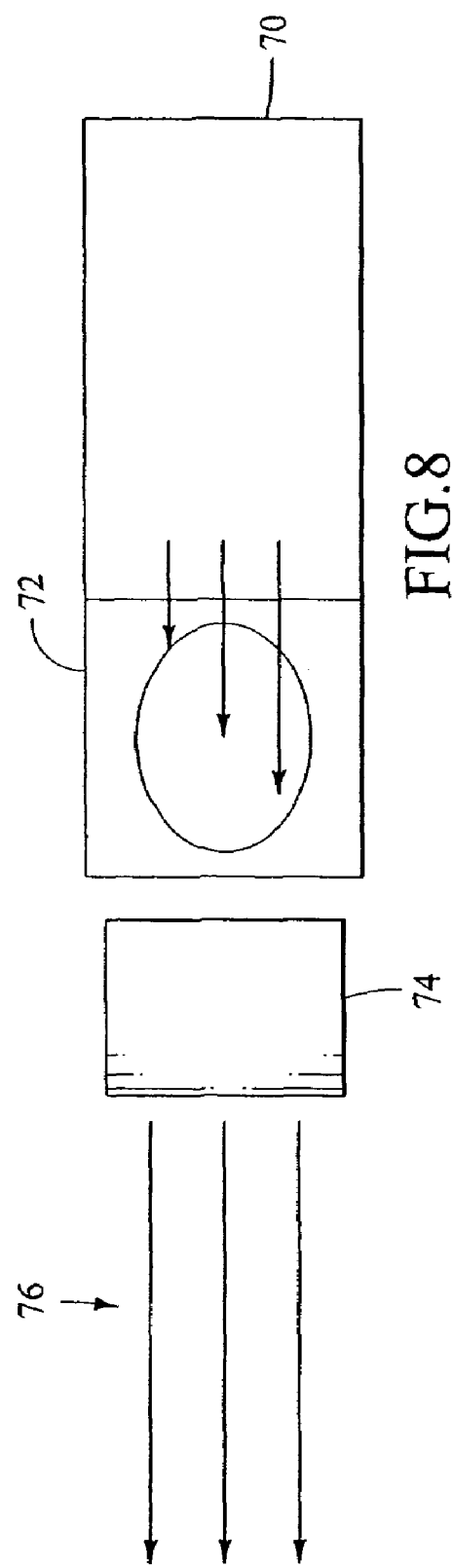

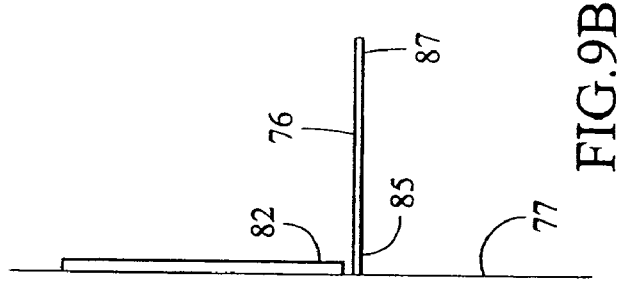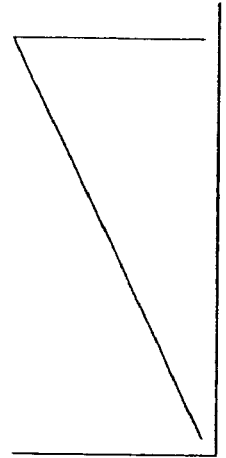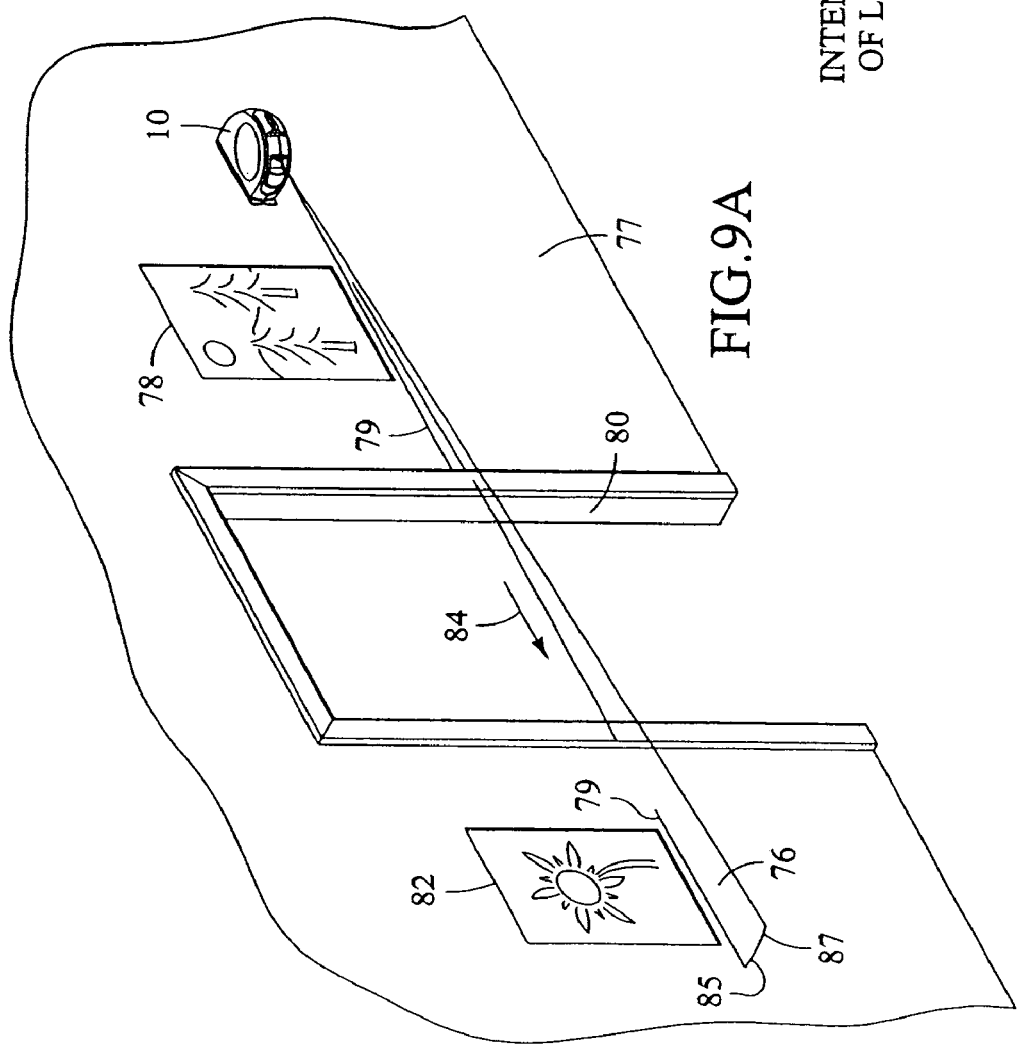

LASER LINE GENERATING DEVICE WITH SWIVEL BASE

The present application is a continuation of, and claims the benefit of priority under 35 U.S.C. § 120 of, U.S. patent application Ser. No. 10/465,534, filed on Jun. 18, 2003 now abandoned, which is hereby incorporated by reference in its entirety.

BACKGROUND

The technical field of the application is that of alignment devices, and in particular an alignment device and an attachment that allows the alignment device to be releasably attached from a surface on which alignment is desired.

Alignment of surfaces is a perennial problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and chalk lines. A home interior decorated with pictures and other wall ornamentation makes a much better appearance when the ornamentation is aligned, especially with respect to vertical or horizontal alignment. Many mechanical and electrical alignment devices are available, and some laser devices are available. Some of these products are cumbersome, others are not suitable for certain uses. Chalk lines, for instance, are sometimes undesirable for use in finished, interior areas.

One aspect of alignment-product performance, and in particular of laser-alignment products, that could be improved is the width, brightness and straightness of the laser light. A visible, straight laser line is acceptable, but may be limited in its brightness over a distance, and may also tend to defocus and become dimmer as a user works away from the source of the laser. Rotating lasers are used to project lines on walls perpendicular to the direction of propagation of the laser. Thus, such devices may have limited utility or may not work in confined spaces requiring a longer alignment tool.

Moreover, a conventional laser is not well-equipped for projecting a flat or planar beam of light. The essence of laser light is that it is coherent or substantially monochromatic, that is, of a single wavelength or a narrow wavelength band. Thus, when a beam of laser light is refracted through a prism, the prism output is not a spreading of the beam as with ordinary "white" light, but rather a coherent, focused beam, very similar to the input. The laser beam is thin and is usefully only visible when projected onto a surface.

Another aspect that could be improved is the inability of laser devices to work around obstructions. That is, if a wall-hanging, such as a picture frame, interrupts the laser beam, it may be blocked from further projection. Therefore, it is necessary to mark locations or heights, one by one, rather than working with the actual objects, in order to align them. Obstructions may include moldings placed in a doorway, picture frames in the way of those being aligned on one horizontal line, the operator of the device, other obstacles, or even textured or stuccoed surfaces on interior walls.

There are devices that direct a laser beam parallel to but away from a surface requiring alignment. A marker device or detector component is then used to sight the beam and mark corresponding locations on the wall adjacent the beam. Use of such a device requires multiple components and at least two people, one to align the laser and another to mark the wall. Moreover, the wall itself requires marking with this method.

A conventional laser beam projector is thus not able to project a laser line on the wall on which it is mounted, nor can it go around obstructions. A laser alignment beam mounting on the wall where alignment is needed would allow a person seeking alignment, whether a carpenter, a painter, or an interior decorator, to accomplish his or her task in a quicker and easier fashion. The ability to work around obstacles would save much time and effort. Such laser alignment devices must be aligned themselves, and are typically equipped with a tripod and a sophisticated leveling device so that they read true for horizontal and vertical plumbs. While leveling is necessary, such sophistication as a tripod adds to the expense and bulkiness of the leveling device. What is desired is a convenient, easy-to-level laser device useful for aligning objects. It would be even more desirable if the alignment device could be easily mounted on a vertical or horizontal surface, and oriented in the desired direction. Better alignment devices are thus required to overcome these deficiencies in the prior art.

BRIEF SUMMARY

One aspect of the invention is a base for a light generating device or a leveling device, having a first surface that includes a connection structure to receive and mount either a light generating device or a leveling device thereto, and a second surface including a nonmechanical attachment structure.

Another aspect of the invention is a light generating device with a base, including a base having a first surface that includes a connection structure and a second surface including a nonmechanical attachment structure. A light generating device is mounted to the first surface via the connection structure.

Another aspect of the invention is a leveling device with a base, including a base having a first surface that includes a connection structure and a second surface including a nonmechanical attachment structure. A leveling device is mounted to the first surface via the connection structure.

Another aspect of the invention is a movable base for a light generating device or a leveling device, including a first portion that has a connection structure to removably receive and mount either a light generating device or a leveling device thereto, and a second portion movably mounted to the first portion.

Another aspect of the invention is a method of aligning objects on a surface. The method includes inserting a light generating device into a movable base, the movable base including an outer portion that has a connection structure to receive and mount the light generating device thereto and an inner portion that includes an attachment structure, the inner portion movably mounted to the outer portion. The method also includes attaching the light generating device and movable base to a surface with an adhesive, orienting the light generating device in at least one plane using at least one bubble level and a movable feature on the light generating device, and aligning at least one object on the surface.

Another aspect of the invention is a method of aligning objects on a surface. The method includes inserting a leveling device into a movable base, the movable base including an outer portion that has a connection structure to receive and mount the leveling device thereto and an inner portion that includes an attachment structure, the inner portion movably mounted to the outer portion. The method also includes attaching the leveling device and movable base to a surface with an adhesive, orienting the leveling device in at least one plane using at least one bubble level and a movable feature on the leveling device, and aligning at least one object on the surface.

Another aspect of the invention is a kit for a light generating device with a base. The kit includes a container defining a volume of space and a base positioned within the volume of space. The base includes a first surface that has a connection structure and a second surface having a nonmechanical attachment structure. A light generating device is positioned within the volume of space so as to be unattached to the base, wherein the connection structure can be used to mount the light generating device to the first surface.

Another aspect of the invention is a kit for a leveling device with a base. The kit includes a container defining a volume of space and a base positioned within the volume of space. The base includes a first surface that has a connection structure and a second surface having a nonmechanical attachment structure. A leveling device is positioned within the volume of space so as to be unattached to the base, wherein the connection structure can be used to mount the leveling device to the first surface.

Each of the above aspects of the present invention provides an improved structure and/or method for mounting or positioning either a leveling device or a light generating device on a surface.

The following drawings form part of the present specification and are included to further demonstrate certain aspects of the present invention. The invention may be better understood by reference to one or more of these drawings in combination with the detailed description of specific embodiments presented herein.

BRIEF DESCRIPTION OF THE DRAWINGS

FIG. 7 depicts a side view of the workings of a second embodiment of laser light generator optics to be used with the laser line generator of FIG. 1.

FIG. 8 depicts a top view of the workings of the laser light generator optics of FIG. 7.

FIGS. 9A, 9B, and 9C depict a laser line generating device projecting the laser light in a narrow beam or fan and aligning objects on a wall.

DETAILED DESCRIPTION OF THE DRAWINGS AND THE PRESENTLY PREFERRED EMBODIMENTS

Figure 1:
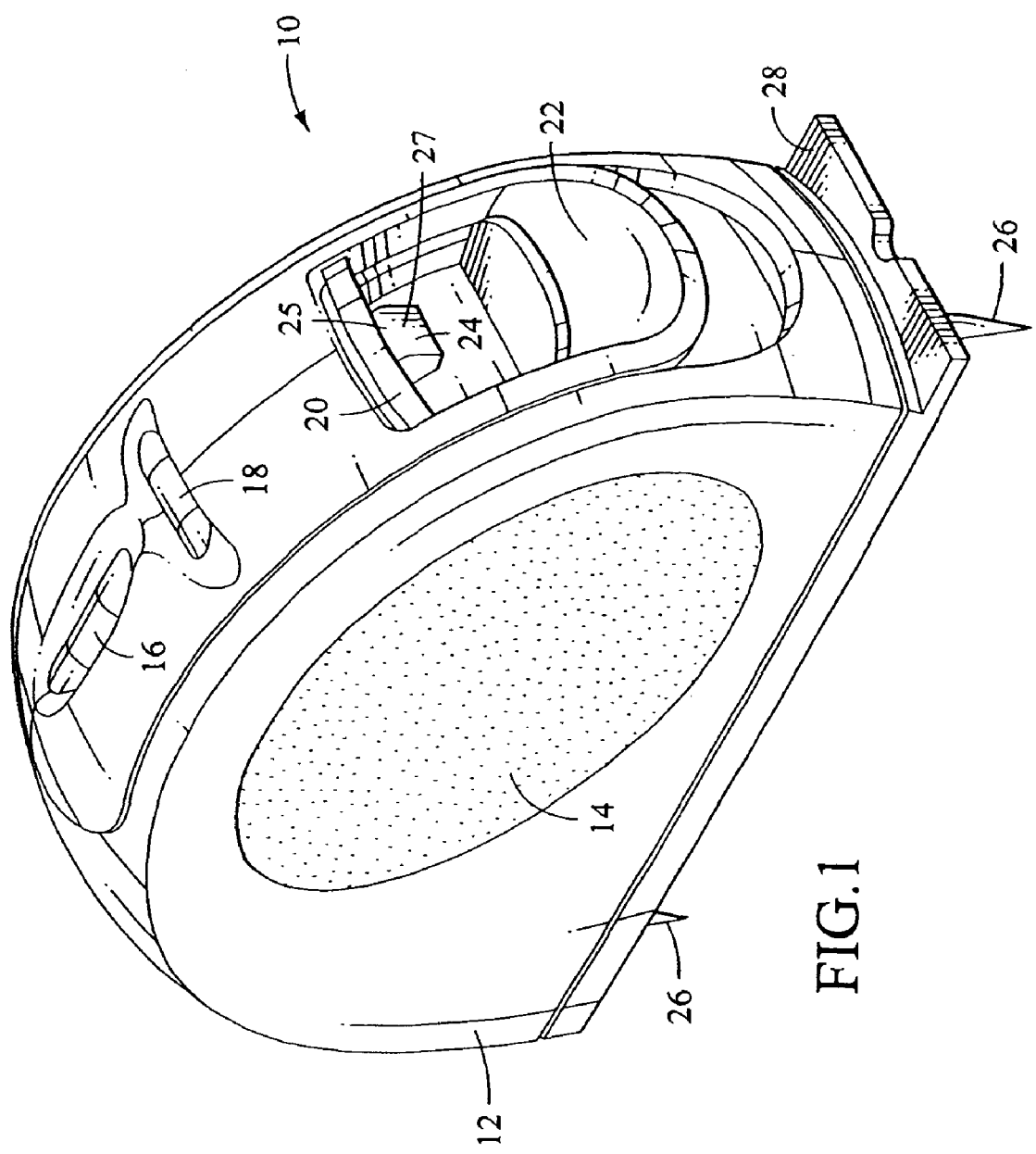
FIG. 1 is an isometric view of an outside of an embodiment of a laser line generator according to the present invention.

The present invention is better understood by reference to the figures and description below. FIG. 1 presents a view of a leveling device, such as laser alignment device and generator 10. The generator comes in a housing 12, which may be made of plastic or other suitable material such as metal. It possesses a handgrip area 14 for handling, the area preferably made of an elastomeric substance for easier gripping. The generator has a first leveling indicator 16, a spirit level or "bubble" for orientation leveling device is selected from the group consisting of a pendulum, a cantilevered tilt mechanism, an electronic leveler, and a shaft held between journals or leveling in one plane, such as horizontal or vertical. It also has a second leveling indicator 18, for orientation or leveling in a second plane perpendicular to the first plane. The housing also contains a protective door 20 with a linked switch for turning on the laser light source when opening the door for access to the laser beam. The generator also may have one or more sliding pin actuators 22 suitable for use by a finger or a thumb and mechanically connected for extending or retracting one or more pins 26 from the generator bottom 28. Without a swivel base attached to bottom 28, each pin desirably penetrates into a surface, such as a drywall or lumber surface, to suspend and hold the laser generator on the surface while it is in use. FIG. 1 depicts the door 20 in an open position and a projection lens 24. The door or aperture 20 provides an exit for the light generated within the housing, and in the open position, does not substantially block the exit of light from the housing.

As shown in FIG. 1, a preferred projection lens 24 includes a rounded corner 25 on its front face 27. The effect of the lens is to shape the laser light passing through it into a planar, fan-shaped "comet beam" or fan shape. The intensity of the light and the shape of the beam may be asymmetric, in which one side of the "comet" may be larger and brighter than the other side. The fan shaped beam is then routed so that the less bright side of the fan-shaped beam is nearest the wall of interest, and the brighter side is away from the wall. In this orientation, the fan-shaped beam of light will propagate a long distance from its origin, and the laser light will be usable a long distance away from the laser line generating device.

The laser light generated by the laser line generator preferably exits from the top, curved corner of the lens. The radius of the corner is desirably from about 0.030 inches (0.75 mm) to about 0.060 (1.50 mm) inches, and preferably about 0.047 inches (1.2 mm). The height of the rounded corner of the lens is desirably one or two inches above the bottom surface of the laser line generating device. When the beam or fan of light exits the lens, it forms a thin plane in the length-wise direction of the device, and the beam forms a plane from the top, curved corner of the lens downward, to the wall or other surface on which alignment is sought. Because the light is now a plane, rather than a pinpoint, it is able to project over and beyond obstacles, allowing a user to align several objects without having to move them.

In the embodiments shown, the laser light projects generally in the direction of the alignment surface, a generally flat, planar bottom support surface. The direction of propagation is the direction the light travels, generally parallel to the wall or surface on which the laser line generating device is mounted. The fan-shaped aspect of the beam is perpendicular to the wall, and is preferably no higher than the height of the lens 24 above the wall. The laser light generating device and its lens are mounted on the wall via pins 26 or with the swivel base, which is discussed below. The fanshape of the beam extends from a height of the lens above the wall to the wall surface itself, in a very thin plane, about 1/32 of an inch thick. The plane of the fan-shaped beam is also perpendicular to the flat bottom surface of the laser line generating device.

Figure 2:
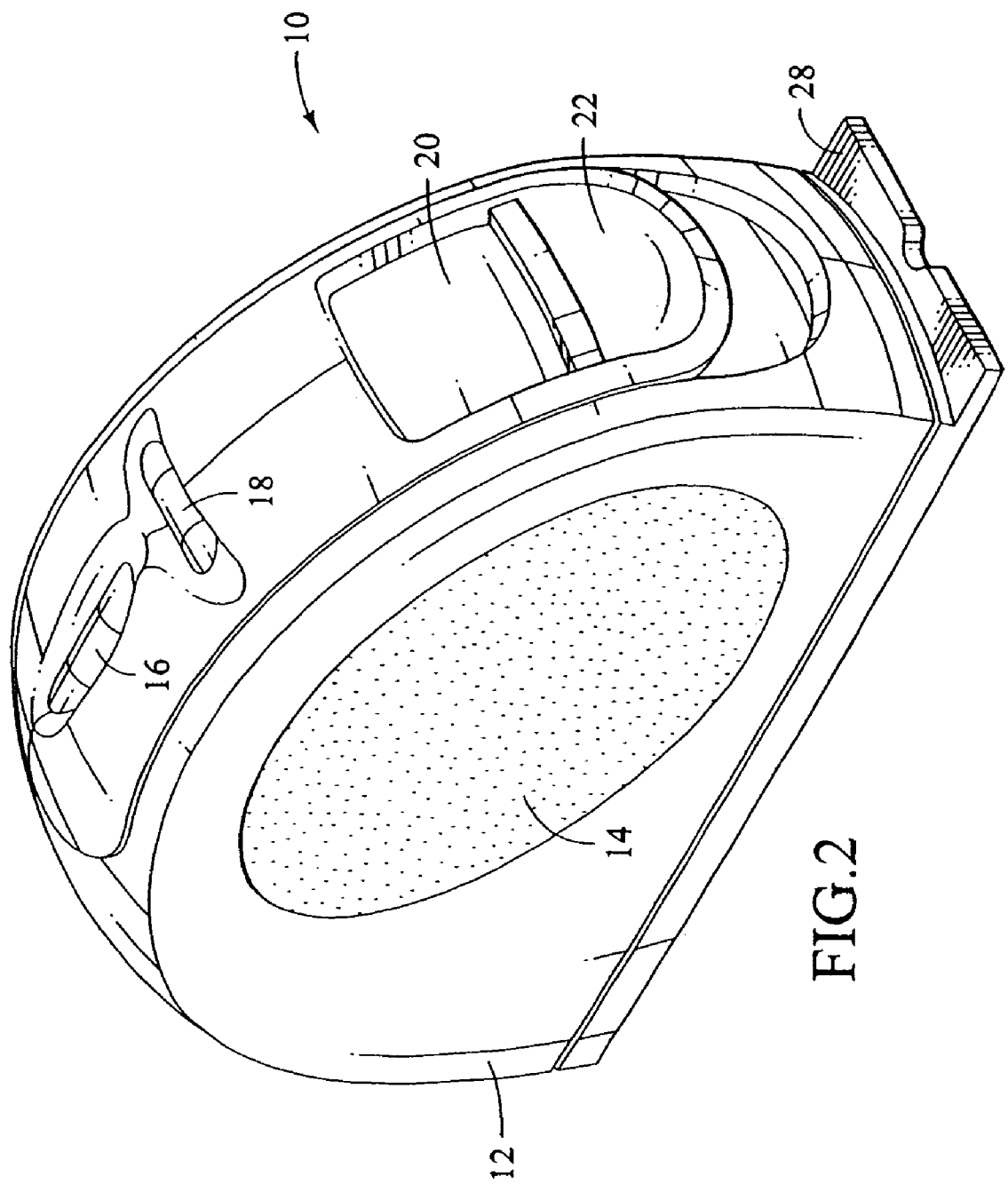
FIG. 2 is an alternate view of the generator of FIG. 1.

FIG. 2 depicts the same device with the door 20 closed, and with a linked internal switch (not shown) open, and the laser thus off. The figure depicts the generator 10, housing 12, gripping surface 14 and levels 16, 18 with pin actuator 22 raised so that the pin remains inside the housing and the laser generator is not suspended on a wall or other surface. The door or aperture 20 may also be a switch for the power supply of the laser line generating device. In the position shown in FIG. 2, with the door closed, the switch is preferably in a closed position and there is no power supplied from the power supply to the light source. In this position, the door acts as a lens cover and substantially blocks the exit of the beam from the device.

Figure 3:
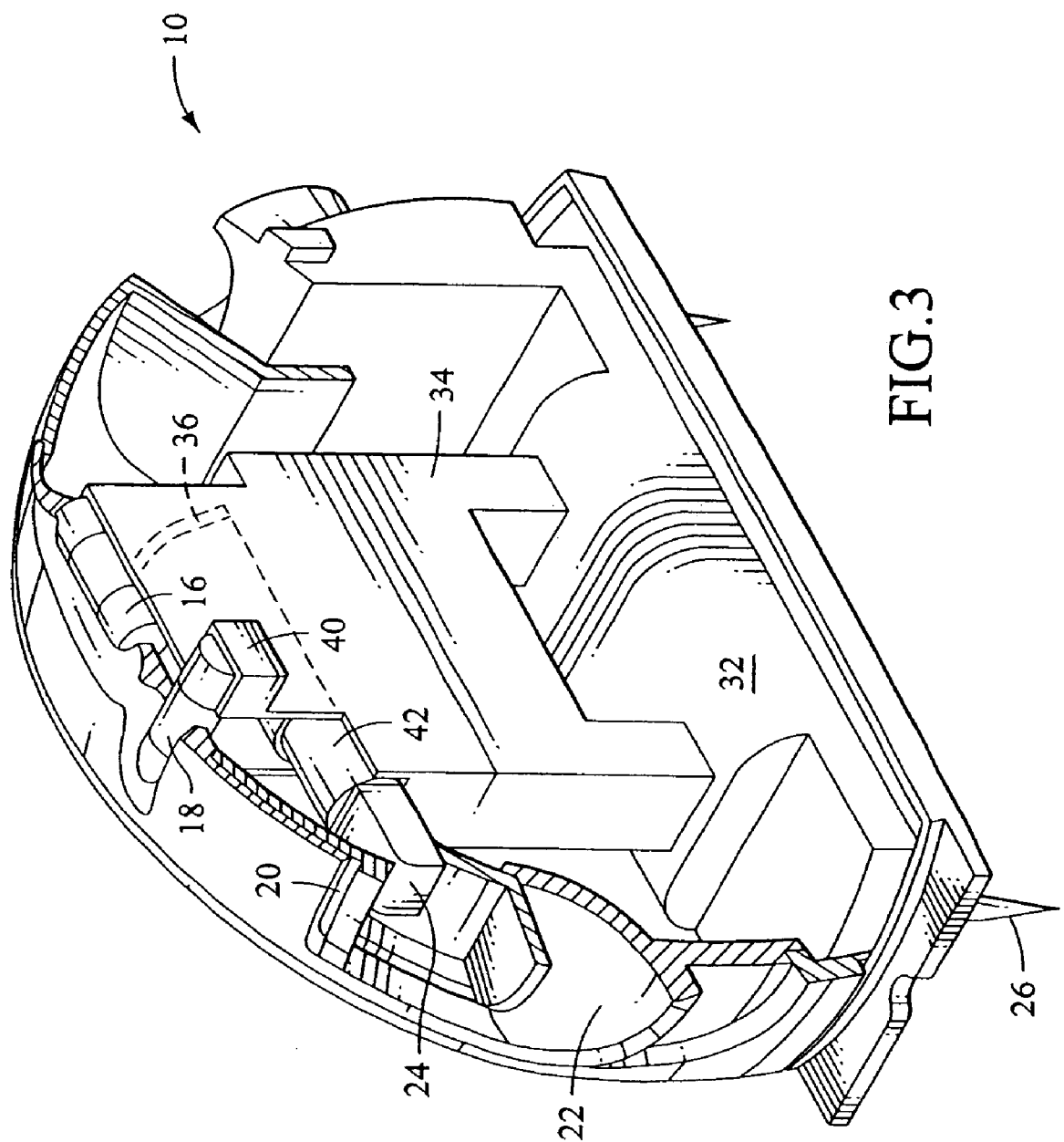
FIG. 3 is a cutaway isometric view showing the inside of the generator of FIG. 1.
Figure 4:
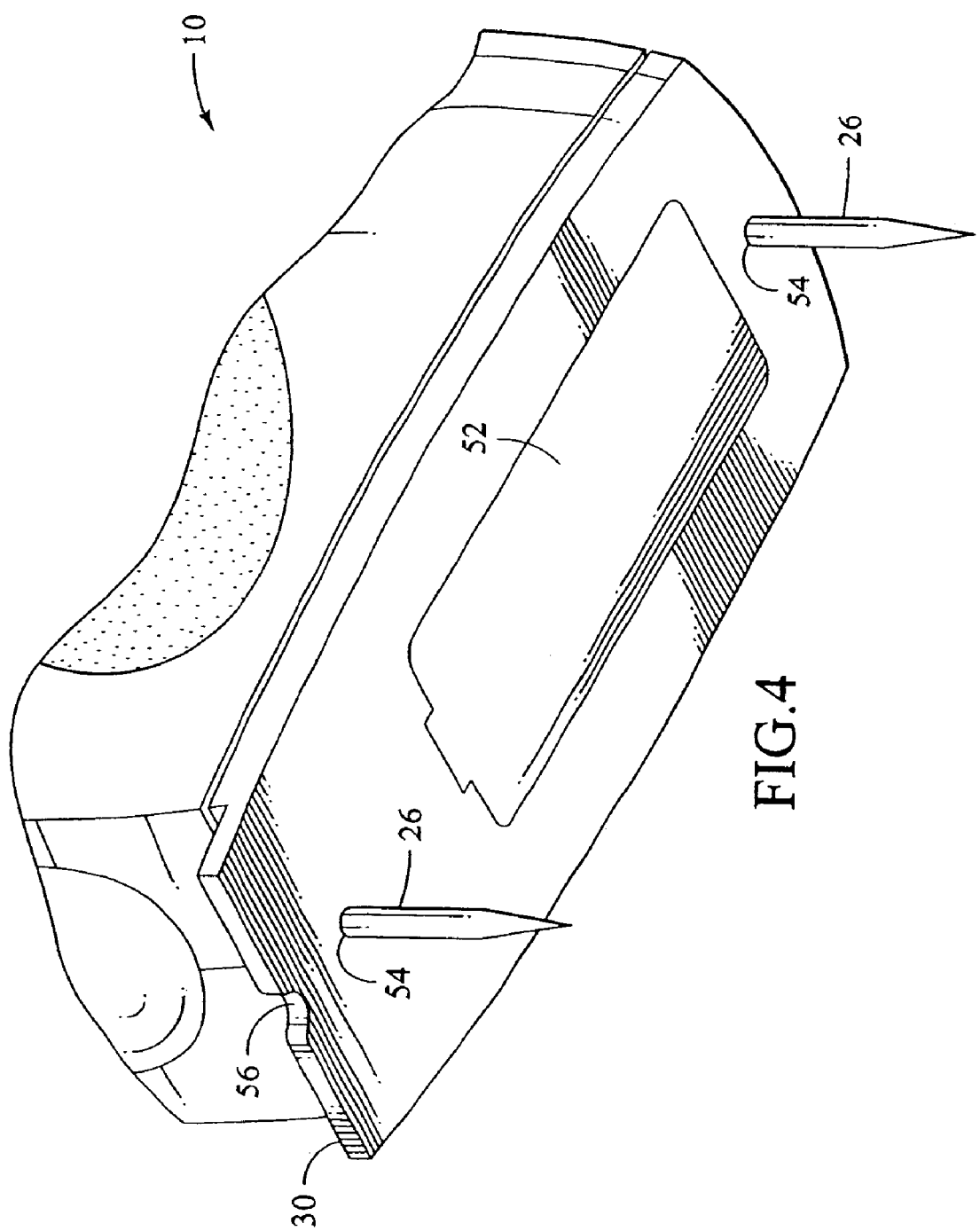
FIG. 4 is a view depicting the bottom of the generator of FIG. 1.
Figure 5:
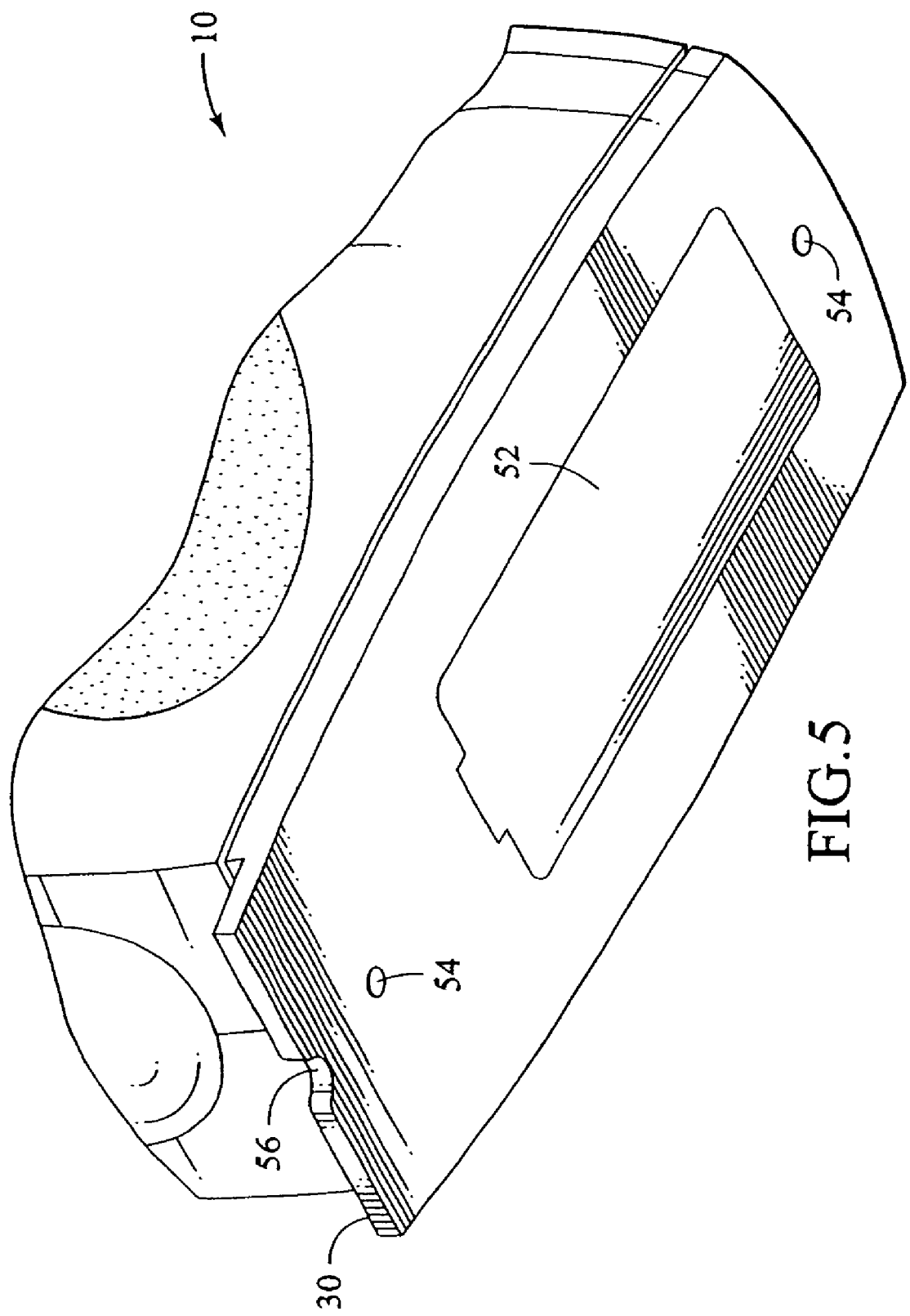
FIG. 5 is another view depicting the bottom of the generator of FIG. 1.

FIG. 3 depicts a cutaway view of the interior of the laser generator, showing a supporting structure 34, 40, for levels 16, 18, and also showing an area for a power source or battery 32, a laser diode 42, a lens 24, and a circuit board 36. FIG. 4 more clearly depicts a view from the bottom or flat face 30 of the generator 10. The bottom surface desirably has a door 52 for access to a battery or power source for the generator. Also shown are holes 54 for the retractable pins 26 used to secure the generator to a wall or a surface. A notch 56 may also be useful for aligning or orienting the generator on a surface. FIG. 5 depicts the bottom of the laser generator with the pins retracted, with a better view of holes 54.

A method of practicing the invention includes providing a surface, such as a wall wherein orientation with a line is desired, and also providing the laser generator. In the case where pins 26 are not used, a user mounts the laser generator 10 via its flat surface and a swivel base (see FIGS. 10-12) onto the wall and orients the laser generator in one or more planes. A reference level, such as bubble level 18, is then used to orient and true the laser generator 10 in one plane, for instance, the vertical plane, using the swiveling swivel base described below. The second bubble level 16 may be used if the user wishes to orient the laser generator 10 in a horizontal plane. When the user is satisfied with the orientation, the user turns on the generator 10, projecting a laser beam from the vertical or horizontal plane of the device. In one embodiment, the generator is turned on by opening the lens door or aperture.

A desirable feature of the invention is that the output of the generator is not merely a linear beam of light, but rather a fan-shaped beam. The fan-shaped beam propagates along the surface of the wall in the direction of propagation. Because the plane of the beam runs perpendicular to the wall along the length of the beam, the line of intersection between the beam and the wall forms a visible line of alignment. With a fan-shaped beam, the laser light is able to project over and beyond obstacles, such as moldings placed in a doorway, picture frames in the way of those being aligned on one horizontal line, or other obstacles, such as a wavy or stuccoed surface on an interior wall. With a conventional laser generator, these obstacles must be removed or the laser itself must be repositioned to avoid each obstacle. Of course, moving and relocating the laser alignment tool destroys the continuity of the line of alignment. Moreover, a conventional laser is not well-equipped for shaping the laser beam into a fan. The essence of laser light is that it is coherent, that is, of a single wavelength or a narrow wavelength band. Thus, when laser light is refracted through a prism, the prism output is not a spreading of the beam as with ordinary "white" light, but rather a coherent, focused beam, very similar to the input. The present invention overcomes this obstacle by sending a sharp, focused pinpoint of light through a specifically constructed lens to create a flat planar, fan-shaped beam of light.

It is also noteworthy that the axis of alignment, such as the alignment of pictures on a wall, is substantially parallel to the direction of propagation of the laser light. By contrast, a conventional and less useful method is to project a laser light perpendicular to a wall or other surface in which alignment is desired, and perpendicular to the direction of propagation. With the instant laser line marking device, a user projects a fan-shaped beam in a propagation direction that is substantially parallel, rather than perpendicular, to the surface on which alignment is desired, the fan-shaped dimension of the beam being perpendicular to the wall.

As seen in FIG. 9a, the laser line generating device propagates light in the length-wise direction of the laser line generating device 10. The direction of propagation, shown by arrow 84, is substantially parallel to the wall, with the fan-shaped aspect of the beam being perpendicular to the wall. In one example, if a narrow fan projects from a line marking device according to the present invention, the beam is "substantially parallel" if it is substantially parallel for at least several lengths of the line marking device in the direction of propagation of the laser. It is substantially parallel because even a "narrow" fan spreads rapidly and the beam is no longer strictly parallel. The device and the beam are easily distinguished, however, from a beam that has a direction of propagation perpendicular to the wall, such as shown in U.S. Pat. No. 5,208,438.

The laser light exits the lens or prism in an elongated fan in a direction of propagation. The direction of propagation, as discussed above, is substantially parallel to the surface on which alignment is desired. The width of the fan, however, is perpendicular to the surface, and the intersection of the beam with the surface generates the visible line of alignment that the user seeks. It is this width that allows the fan to project over and beyond obstacles. That is, even though an obstacle may partially obscure the fan-shaped beam of light, at least part of the fan-shaped beam extends above and beyond the obstacle, and a user may continue to align objects on which alignment is desired.

Figure 6:
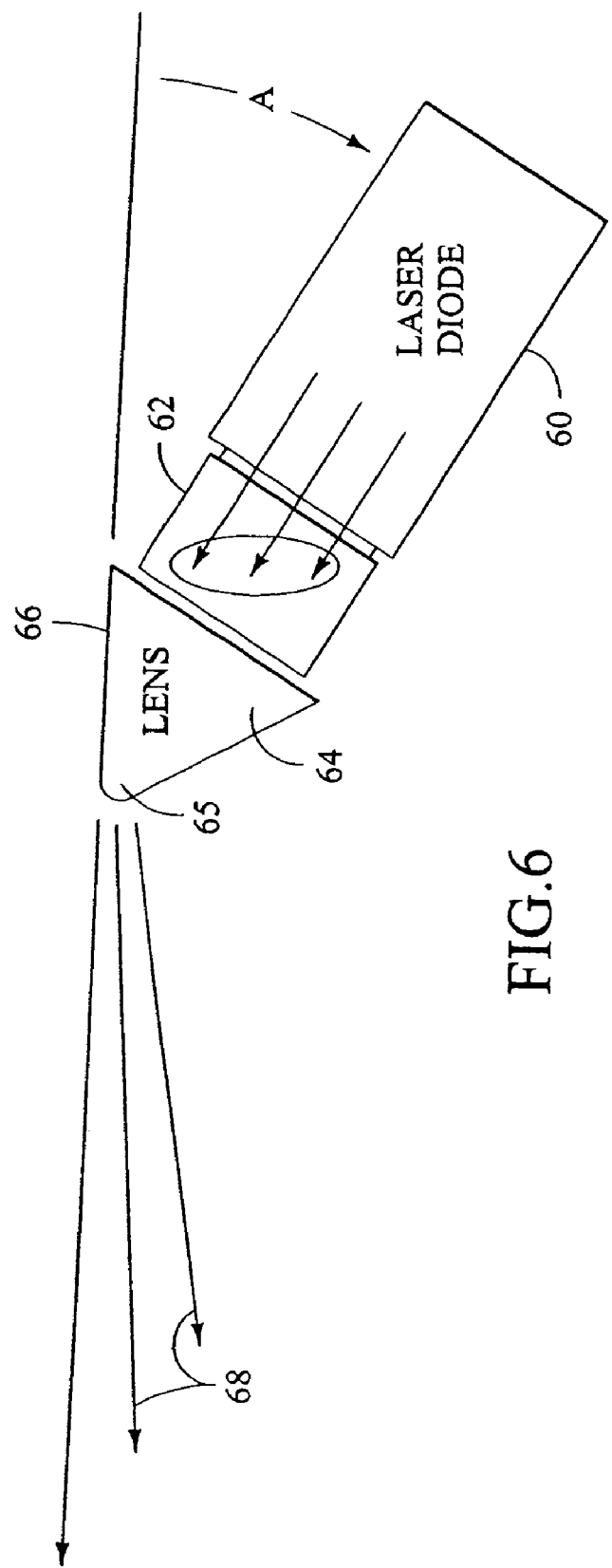
FIG. 6 depicts an embodiment of optics to be used with the laser light generator of FIG. 1.

FIG. 6 depicts an embodiment of the invention, in which a laser diode 60 emits coherent laser light, such as, coherent laser light at 635 nm wavelength. The light is collimated into an ovate shape by collimation optics 62, for instance at least one collimating lens, by techniques well known to those skilled in optic arts. The ovate beam then enters a projection lens 64 from the right side in FIG. 6, desirably at an angle in which total internal reflection will occur, that is, all the incident light will be reflected rather than refracted from the back face of the lens. It has been found that this phenomenon is reinforced further if the back surface 66 of the lens is mirrored. The phenomenon is also reinforced if a corner of the lens or prism is radiused as mentioned above. When the light emerges from the radiused corner 65 of the projection lens 64 in FIG. 6, it is in the shape of a narrow beam or fan, rather than a single point or beam of light, and is able to extend around and beyond obstacles for the convenience of a user. In one embodiment of the invention, the angle A between the mirror surface of the collimating lens and the incident light from the laser diode source is from about 60 to about 65 degrees, preferably about 63 degrees, for maximum reflection of light through the lens, rather than refraction at angles that detract from the performance of the generator. In this depiction, the light 68 is planar within the plane of the paper, when it leaves the lens. In one embodiment of the invention, the laser diode, the collimation lens, and the projection lens are contained within a single element, such as a laser diode with included collimating optics.

In one embodiment shown in FIG. 6, an aspherical projection lens 64 is made from optic grade glass, in the form of an equilateral triangle with the back face mirrored. Desirably, the lens is about 0.45 inches on a side, with one corner 65 radiused to about 0.030 to about 0.060 inches and the other corners rounded to a radius of 0.005 to 0.015 inches. With this geometry, the lens or prism is able to focus an ovate beam into a planar fan-shaped beam useful for aligning objects.

FIG. 7 depicts a side view of another embodiment of the invention, in which a laser light source 70, such as a laser diode, emits laser light, which is collimated into an ovate shape by collimating optics 72 and then sent to an aspherical projection lens 74 with one corner 75 radiused as mentioned above for projection of a narrow fan of light 76. In one embodiment, the axes of the ovate-shaped beam sent to the lens are about $3/16$ inches by about $1/16$ inch. The planar, fan-shaped beam 76 emerging from projection lens 74 is than about $1/32$ inch thick. Note that the top corner 75 on the face of the lens in FIG. 7 is radiused from about 0.030 to about 0.060 inches, and preferably about 0.047 inches. FIG. 8 depicts the same embodiment in a top view, in which the rounding may not be observable. The source of laser light 70 generates visible laser light and the collimating optics 72 shape the light into a narrow beam. From the top view, the beam of light is very thin and is about the width of the projection lens 74, 0.4 inches wide. From the side view, the projected light is a thin beam; from the top view, the projected light is a thin fan.

One embodiment of the invention features a lens, such as the lenses depicted in FIGS. 7 and 8, that is about 0.4 inches (10 mm) square, and about 0.1 inches thick (2.5 mm) in the direction of propagation, that is able to focus the incoming laser light beam and reflect it into a planar fan shape. The lenses are aspherical, cylindrical lenses. The lens may be made from one of several optical-grade clear, highly transparent materials, including BK7 glass having an index of refraction of about 1.5168 and a Vd of 64.17. In another embodiment, acrylic resin having an index of refraction of 1.4917 and a Vd of about 55.31 is useful. It has been found that the lens works better if the exit face has only one corner radiused about 0.047 inches, with the other faces being radiused for normal manufacturing custom, to about 0.005 to about 0.015 inches. More details on the performance of these lenses are discussed in copending application U.S. patent application Ser. No. 10/141,392, entitled Laser Line Generating Device, assigned to the assignee of the present application and which is hereby incorporated by reference in its entirety.

FIG. 9A demonstrates the use of an embodiment of a laser generator 10 according to the present invention, in which a fan-shaped beam 76 is able to align a first picture frame 78 on wall 77. The generator is convenient to use because it projects a laser beam on the wall adjacent the generator. The beam is able to overcome obstacles such as door moldings 80 with its fan shape and extend above the molding with sufficient clarity to align another object, such as picture frame 82. It is able to overcome these obstacles because the corner from which the light exits is one or two inches removed or offset from the wall, allowing a fan or beam of light to form. The direction of propagation 84 generally is in the direction from the generator to the objects on which alignment is desired, such as picture frames. At the same time, the width of the fan is perpendicular to the wall 77 on which the paintings are hung or on which, more generally, alignment is desired. The fan-shaped beam 76 intersects the wall 77 and the light is visible on the wall at the intersection 79 of the fan-shaped beam 76 with the wall 77. In one embodiment, the housing of the laser line generator is a support face that substantially extends along a first planar surface, such as wall 77, and the fan shaped beam 76 substantially lies within a second planar surface, such as the plane of light 76. The second planar surface may intersect the first planar surface at an angle. The angle may preferably be 90°, or a right angle between the fan-shaped beam and the surface on which objects are to be aligned.

The "comet" effect means that the intensity of the planar fan is less nearer the wall and greater away from the wall, so that the beam is able to usefully travel further, and enable a user to align objects at greater distances. Thus, in FIGS. 9B and 9C, the intensity of the laser light will be greater at outer edge 87 than at the inner edge 85 where the fan-shaped beam intersects the wall 77 while the beam is used to align object 82, such as a picture frame. There is no practical limitation to the distance the fan-shaped beam can travel. Laser diodes of 5-15 mW can be successfully used to project beams 30-50 feet long along painted wall-board surfaces. In one embodiment, the fan-shaped beam is projectable as a visible line extending at least about 5 lengths away from the housing for aligning objects.

Figure 10:
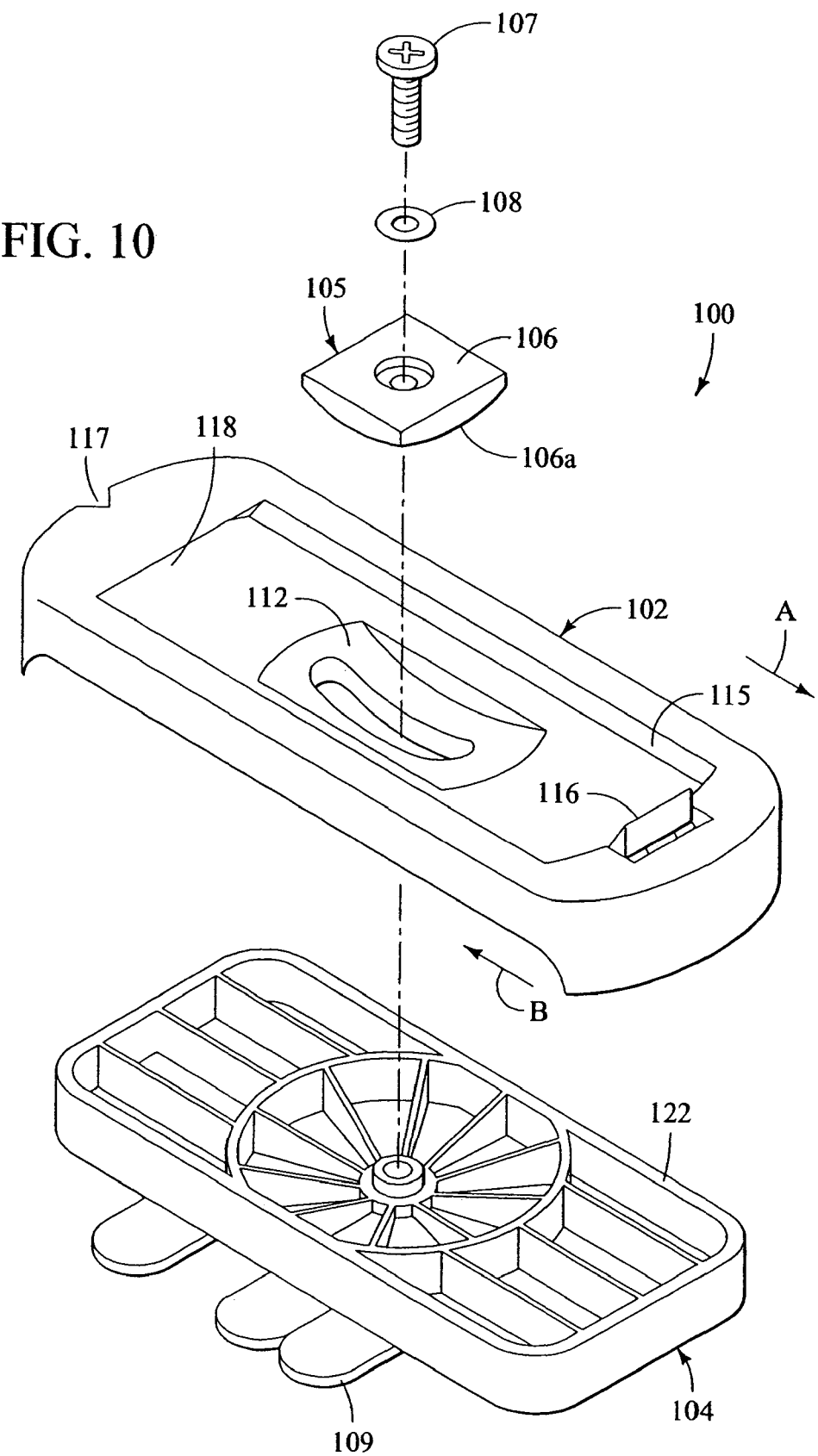
FIG. 10 depicts an exploded view of a swivel base for the laser line generating device.

The laser line generator 10 described previously with respect to FIGS. 1-9C can be utilized with an adhesive base or attachment, an embodiment of which is depicted in FIGS. 10-13. FIG. 10 shows an exploded view of the attachment 100. Attachment 100 includes an inner or top portion 102, an outer or bottom portion 104 and a joining portion 105. The joining portion may include a large plastic retainer 106, a bolt 107, washer 108, and a nut 125. Top and bottom portions 102, 104 may be molded from any convenient plastic, and nut 125 may be molded into bottom portion 104. The attachment is assembled with a fastener, such as bolt 107 threaded into nut 125. Retainer 106 fits into a recess 112 on the top surface of top portion 102. Retainer 106 may be flat on its top and convex on its bottom surface 106a to match the contours of the concave recess 112. Adhesive strips 109 are mountable to the bottom surface 126 of bottom portion 104, and portions thereof or release tabs 127 for strips 109 may protrude from the side of the attachment. Additional washers, such as lock washers, may also be used with the fastener and retainer. Top portion 102 also mounts a latch 116 for retaining the laser line generator on the swivel base. The top portion may also mount one or more level indicators, such as the bubble levels described above, for one or more axes of the top portion, such as on the long and short sides of top portion 102. With these levels, a user may place the base on a wall and use the bubble levels to orient first the swivel base and then the laser line generator to a true plumb alignment.

In addition to manual level indicators, as described above, the swivel base may also include other automatic levelers. These devices may include automatic pendulum-type levelers, in which an internal or external pendulum, along with gravity, orients and levels the swivel base, and thus the laser line generator. Other automatic levelers could include electronic levelers, a shaft held between journals, cantilevered tilt mechanisms, and so forth. Details on some of these levelers are disclosed in U.S. Pat. Nos. 4,031,629, 4,751,782, 5,075,977, and 5,992,029, among others.

Figure 11A:
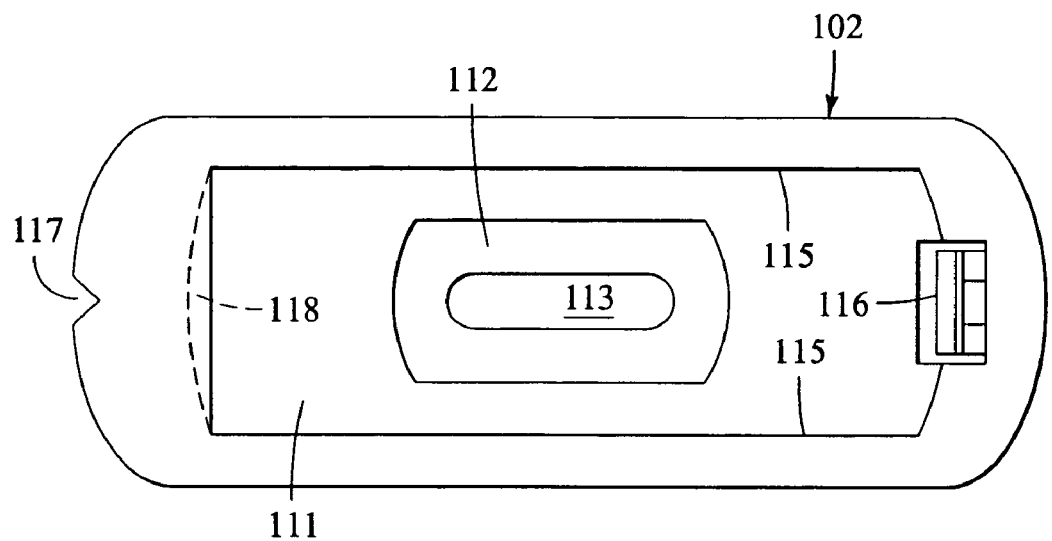
FIGS. 11a and 11b depict top and bottom views of the top portion of the embodiment of FIG. 10.
Figure 11B:
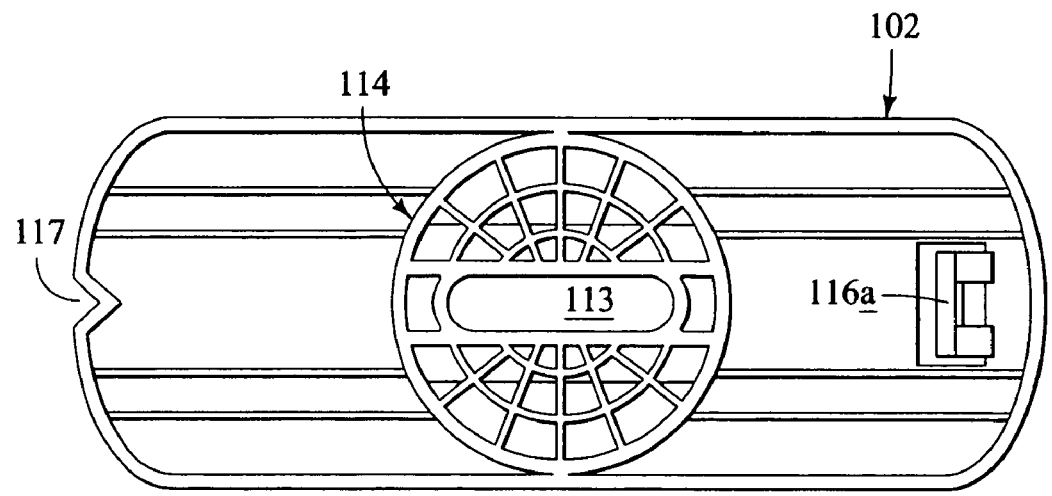

FIGS. 11a and 11b are more detailed views of the top and bottom of top portion 102 of the attachment. Top portion 102 includes a flat surface 111, a recess 112, and an orifice 113. Flat surface 111 may be adapted so that the bottom surface of the laser line generator 10 of FIGS. 1-9C, contacts flush with the flat surface between sidewalls 115, which, along with latch 116, retain the laser line generator securely in the swivel base. In the preferred embodiment, the surface is slightly recessed. The end of top portion 102 opposite latch 116 has another recess 118, for receiving a portion of laser line generator bottom 28.

Recess 112 is curved to match the bottom, interface surface 114 of top portion 102. Interface surface 114 allows top portion 102 to swivel or rotate relative to bottom portion 104 for a full 360° swiveling and orienting capability. The underside interface surface 114, which comprises a convex shape, may be solid or may be ribbed as shown for lighter weight and ease of use of both the swivel base and the mounted laser line generating device.

A user inserts the bottom 30 of laser line generating device 10 of FIGS. 1-9C into recess 118 on flat surface 111, while urging latch 116 forward, in the direction of arrow A. After the bottom 30 of the laser line generating device 10 is inserted and is resting on flat surface 111, latch 116 is released. Latch 116 then moves in the direction of arrow B, and helps to retain the laser line generator in position on top portion 102. Latch 116 may be a snap-fit design that can snap into place without the need to urge the latch forward, with a bottom surface 116a flat to match bottom 30 of laser line generator 10. Top portion 102 may also have a notch 117 to assist in marking purposes. When removing the device 10 from top portion 102, latch 116 may be urged forward to release the device from top portion 102.

In another alternative embodiment of the connection structure, the connection structure of FIGS. 10-13 is interchanged so that the bottom surface of the laser line generator 10 includes side walls and recesses similar to side walls 115 and recesses 118 of FIGS. 10-13. The bottom surface of the laser line generator also includes a latch similar to latch 116. The base and laser line generator are attached to one another by inserting the top portion of the attachment into the recessed area of the bottom surface of the generator and then applying the latch in a manner described previously for embodiments of FIGS. 10-13.

Figure 12A:
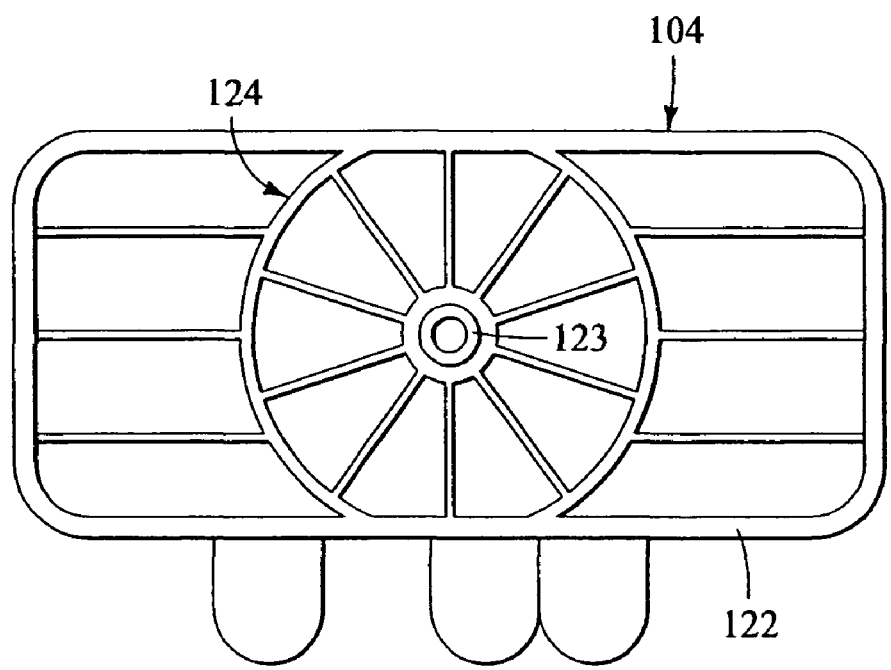
FIGS. 12a and 12b depict top and bottom views of the bottom portion of the embodiment of FIG. 10.
Figure 12B:
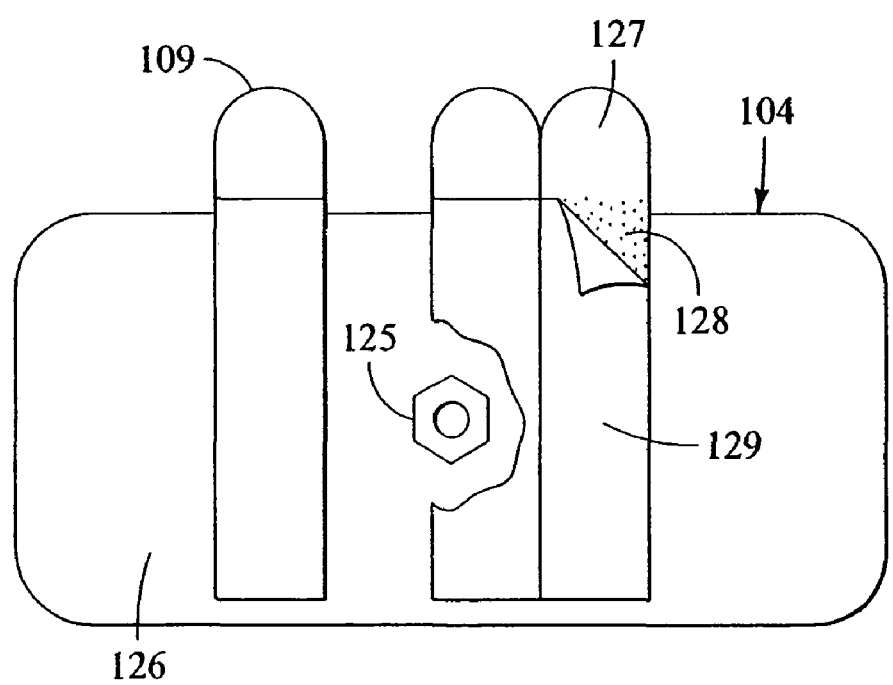

FIGS. 12A and 12B provide top and bottom views of bottom portion 104 of adhesive base attachment 100. Bottom portion 104 has a top surface 122 and an interface surface 124 that is curved to match the bottom interface surface 114 of top portion 102. Top interface surface 124 is concave to match convex interface surface 114. This surface may also be ribbed as shown for lighter weight, or may be made from solid material. The remainder of top surface 122 may be solid or may be ribbed, including rib 123 aligned for nut 125 which is molded into bottom portion 104. Bottom surface 126 of bottom portion 104 is preferably flat for mounting adhesive strips 109, comprising adhesive 128, release liners 129 and release tabs 127. Flat bottom surface 126 and adhesive strips 109 form an adhesive interface surface for the laser line generator with swivel base.

Adhesive 128 is preferably a removable pressure-sensitive adhesive for mounting the attachment 100 to a wall. The special adhesive used allows for easy removal from a wall on one side and for easy removal from surface 126 on the other side of the adhesive. Pressure-sensitive adhesives, such as adhesive 128, are self-adhering with a slight amount of pressure, rather than adhesives requiring heat or water activation. Pressure-sensitive adhesives may be made from rubber-based or acrylic stocks, and may be manufactured in several ways. For instance, a central carrier or foam core may have pressure-sensitive adhesive applied by a hot melt process, a solvent-evaporation process, or an emulsion process. A release liner may be applied to one or both sides of the adhesive. Strong double-sided tape may be used as well.

In the preferred embodiment, a first release liner (not shown) is removed from one side of the adhesive so that the adhesive may be secured to bottom surface 126. Release liner 129 on the other side is then removed and the swivel base and laser line generator are then adhered to a surface on which objects are to be aligned, such as wall 77 of FIGS. 9A-9B. If removable pressure-sensitive adhesives are used, the swivel base may be removed without damaging the surface on which the objects were aligned. While many such adhesives may be used, "Command Strips," from the 3M Company, Minneapolis, Minn., are preferred. These adhesives are actually two adhesives interlocked in the center. These adhesives may be purchased, separable and aligned, for single use in adhering the swivel base, and the laser line generating device, to a wall or other surface. A pack of six strips may be adhered to the bottom surface of the swivel base in a group as shown, for example, in FIG. 12B. A single release liner 129 from one of the strips is then removed and the swivel base 100 is removably affixed to a wall on which alignment of objects is desired. When the alignment operation is completed, the outer release tab 127 is then pulled to release the adhesive strip from the wall and the used adhesive is discarded.

Figure 13:
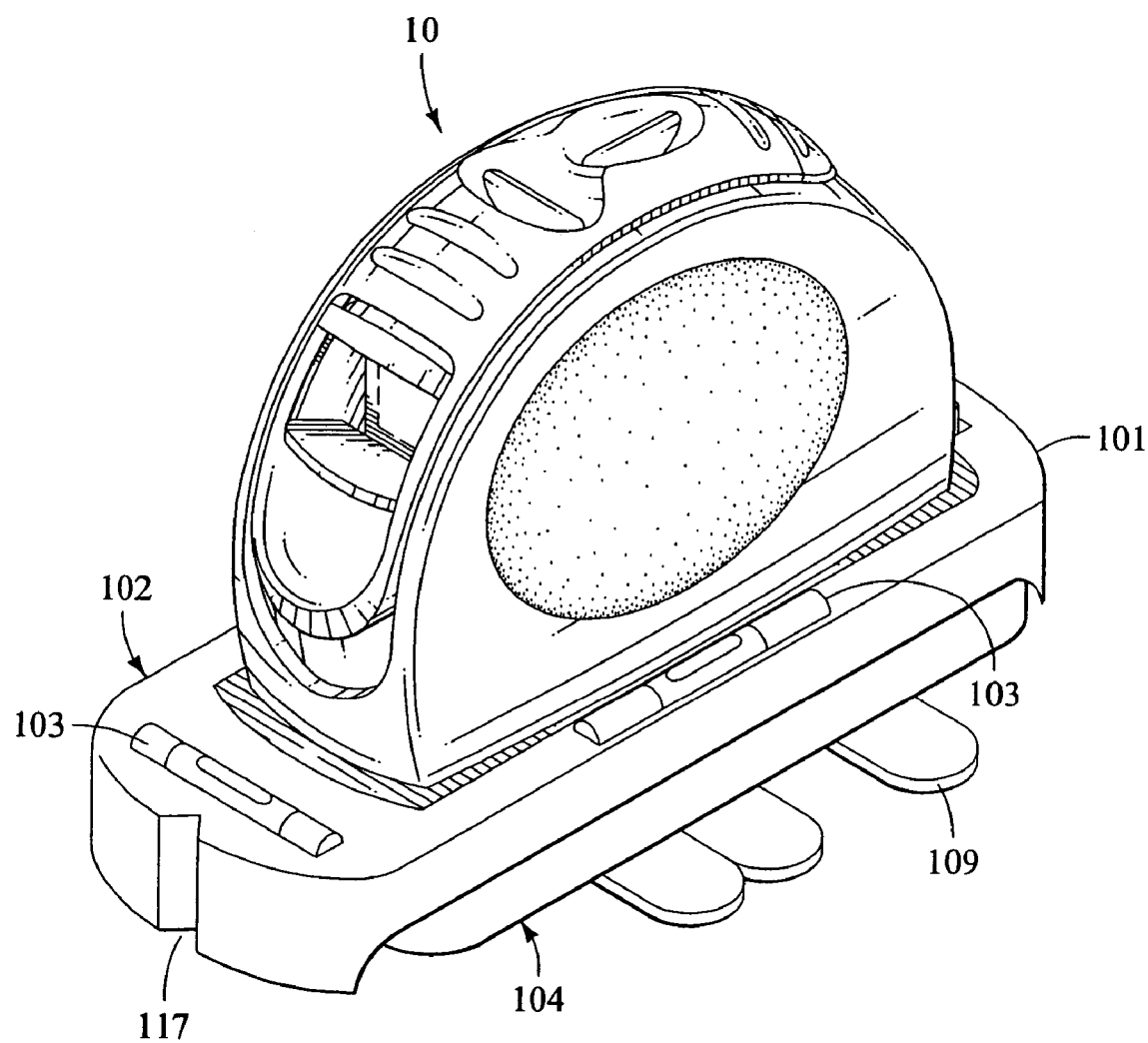
FIG. 13 depicts an assembled laser line generator with swivel base.

In use, the laser line generator 10 and the base 100 can be packaged as separate from one another within a volume of space defined by a container, wherein the container, generator and base define a kit. In one embodiment, the swivel base may also contain level indicators, such as spirit or bubble levels. Once the generator and base are removed from the container, the laser line generator 10 is assembled or placed onto top portion 102 of the swivel base 101, with at least one adhesive strip 109 in place on bottom portion 104, as depicted in FIG. 13. Swivel base 101 is virtually identical to previously-described swivel base 100, but swivel base 101 also includes spirit levels 103 oriented on two planes of top surface 102 of swivel base 101. Using the ability of the base to swivel and rotate, the user tilts the laser line generator in the desired direction and then uses the bubble levels 16, 18 to level laser line generator 10. The combination of laser line generator 10 and swivel base 100 is used in the same manner as that described with reference to FIGS. 9A-9C, with fan-shaped beam 76 propagating in the direction from the laser line generator 10 to objects 78, 82 to be aligned, the width of fan-shaped beam 76 being perpendicular to wall 77. When the user has completed the alignment task, the user pulls on the release tab 127, releasing the adhesive from wall 77 or other surface. The adhesive strip that was used may then be removed from bottom surface 126 of bottom portion 104 and discarded. The user may then go on to other alignment tasks as desired.

In other embodiments of the connection structure, either the base 30 of the generator 10 or the top portion 102 may be provided with a magnet that mates magnetically with either another magnet material or ferrous material on the opposing surface. This can retain the laser generator 10 to the swivel base without the use of a latching structure. Hook and loop fasteners, such as Velcro®, may also be used to attach the laser generator to the swivel base. Magnetic attraction may also be used with a magnet on one of the top portion or generator, and a metal plate, such as steel or iron, on the other. Other ways may also be used, such as a tab-and-slot arrangement, with a slot or groove on the bottom portion and a matching tab or other feature on the top portion. All these are ways to join the top portion of the swivel base to the light generator.

Figure 14A:
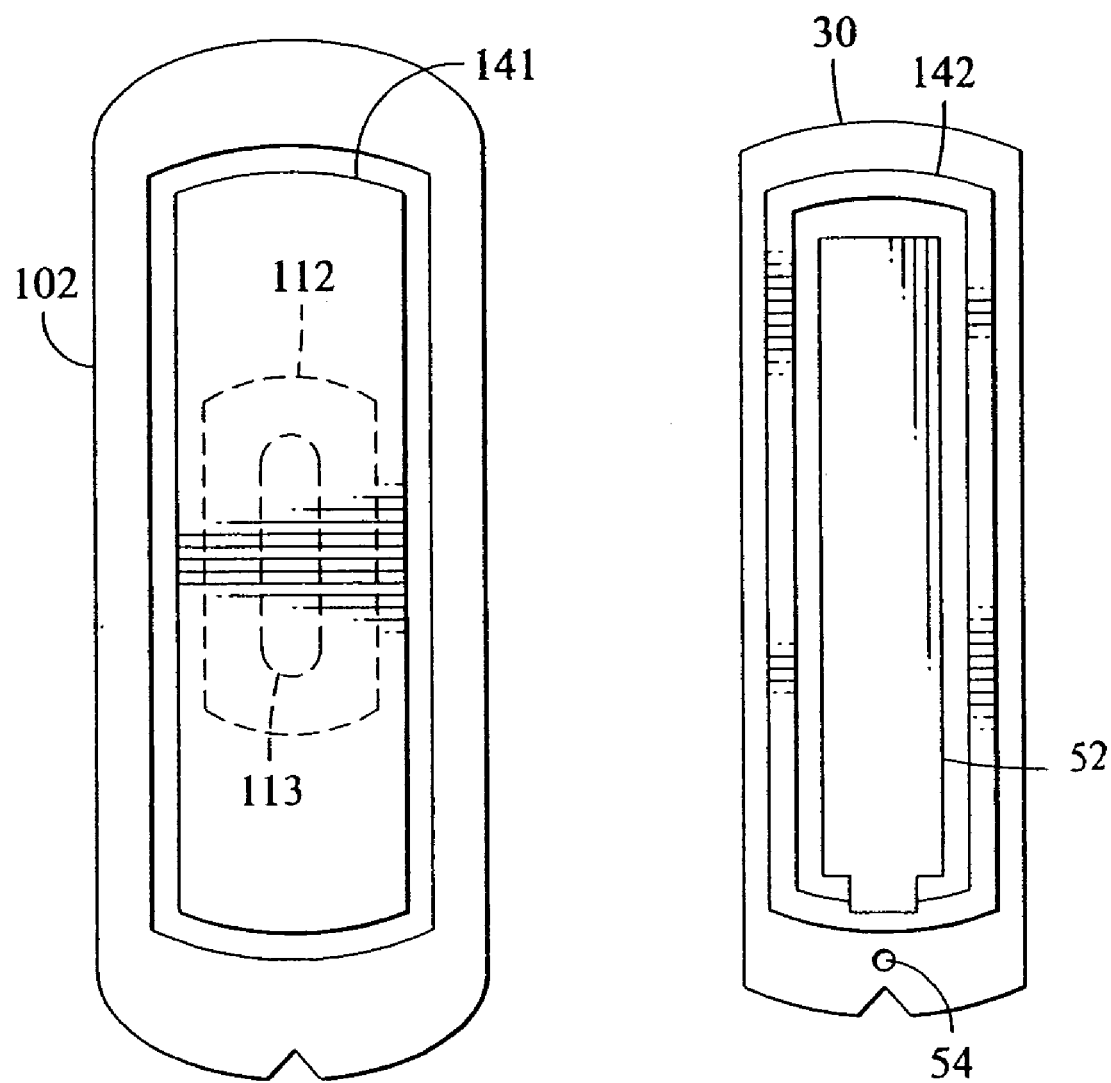
FIGS. 14A, 14B, and 15 depict other techniques used to assemble a light generator to a swivel base.
Figure 14B:
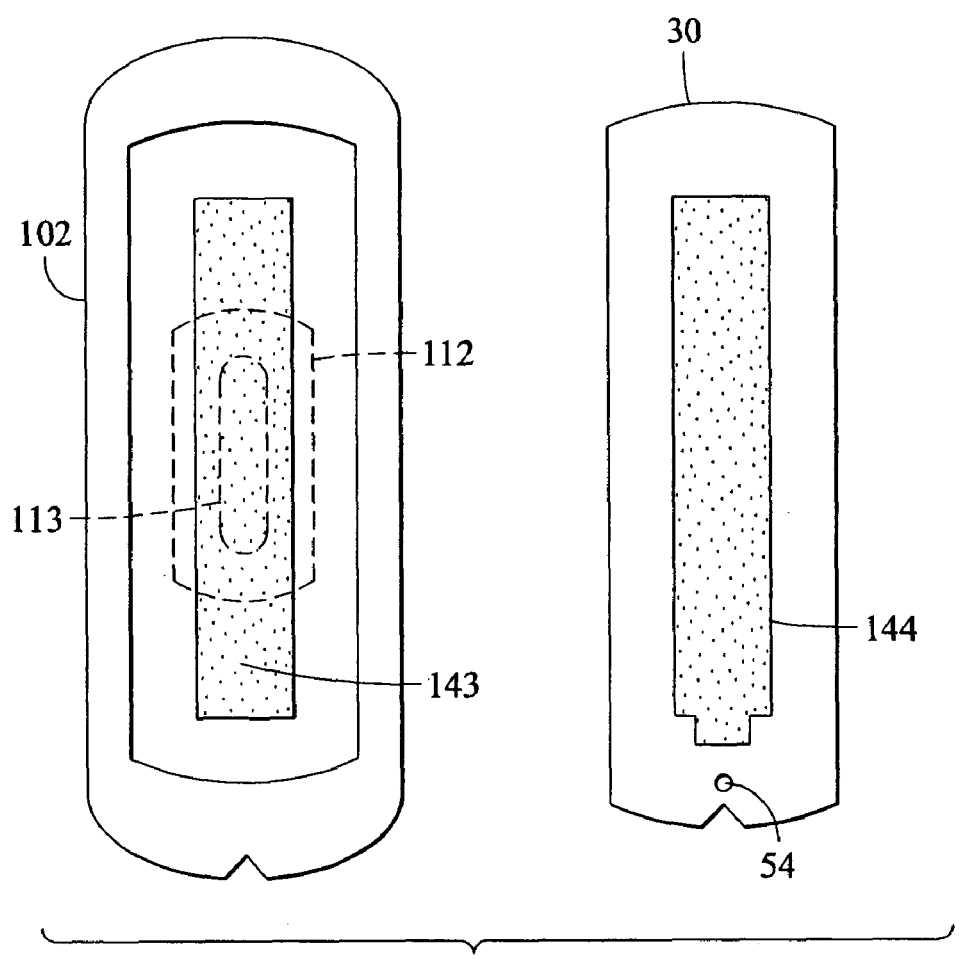
Figure 15:
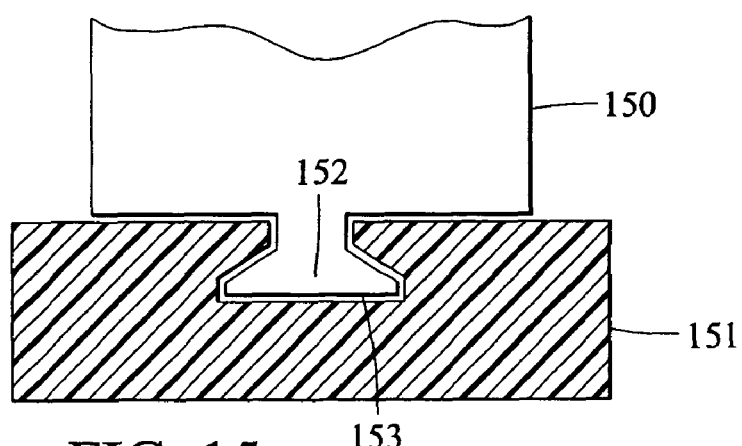

Some of these other ways are depicted in FIGS. 14A, 14B, and 15. For instance, in FIG. 14A, the swivel base top 102 may mount a ferrous plate 141 on its front face, while the light generator bottom 30 mounts a magnet 142 on its bottom 30 near battery door 52 to attract and hold the ferrous plate and the stud finder. Ferrous plate 141 may lie atop the recess 112 and orifice 113 which may still be utilized to mount top 102 of the swivel base to the bottom portion of the swivel base (see FIG. 10). In another method, shown in FIG. 14B, the swivel base bottom 102 mounts a hook portion 143 of a hook and loop fastener, such as Velcro®, while the light generator bottom 30 mounts the loop portion 144 as part of the battery door, to hold light generator 10 to top portion 102 of the swivel base. As is well known, hook and loop fasteners are typically adhered to devices by an adhesive that very firmly bonds the fastener to the device. This adhesive attachment is an inherent part of the hook and loop fasteners herein described. FIG. 15 depicts another way to mount the light generator 150 onto the swivel base top 151, by providing a tab 152 on the bottom surface of light generator 150, and by providing a matching slot 153 in the top surface 151 of the swivel base, so the light generator may be slid into the swivel base. A catch or retainer may also be used to insure retention of the light generator when the assembly is held vertically.

Figure 16:
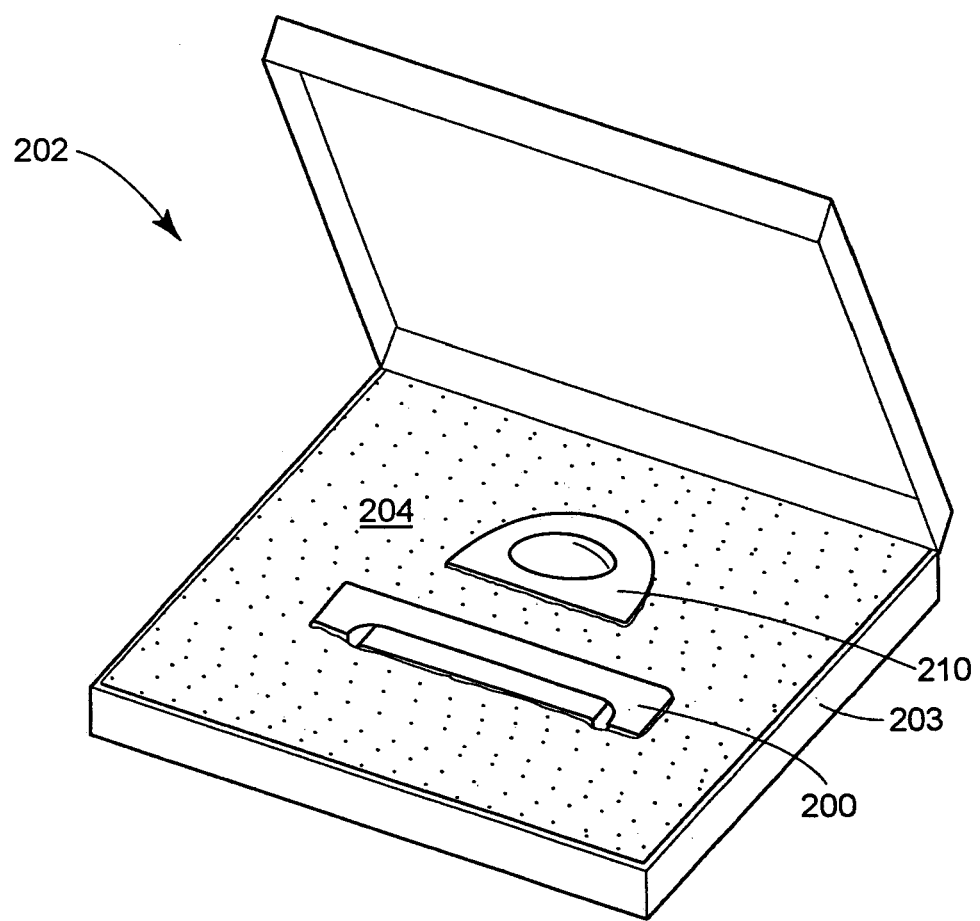
FIG. 16 illustrates an exemplary embodiment of a kit which contains a base and a light generating device or a leveling device.

FIG. 16 illustrates a kit 202 including a container 203 the walls of which define a space 204 which contains a laser line generating device or a leveling device 210 and a base 200. The laser line generating device or leveling device 210 is positioned within the space 204 such that it is unattached to the base 200.

While this invention has been shown and described in connection with the preferred embodiments, it is apparent that certain changes and modifications, in addition to those mentioned above, may be made from the basic features of this invention. While the laser line generator may be most convenient to use when mounted to a wall, it may also be mounted on a table, floor, or other flat surface, and used to project a line without being mounted on a wall. While the swivel base may be used with the described laser line generator, the swivel base may also be used with other leveling devices, laser generators, or with other non-laser light or line generators. Many other variations of the invention may also be used without departing from the principles outlined above. Accordingly, it is the intention of the applicant to protect all variations and modifications within the valid scope of the present invention. It is intended that the invention by defined by the following claims. including all equivalents.

What is claimed is:

1. A base for a light generating device or a leveling device, comprising:
a first portion having a planar surface at least partially surrounded by a rim, the rim having a pocket formed therein, and a concave recess formed in the planar surface; and
a second portion attached to the first portion, the second portion having a nonmechanical attachment structure opposite the first portion,
wherein the first portion is adapted to removably mount a light generating device or a leveling device to the first portion along the planar surface,
wherein the first portion is both pivotable and rotatable relative to the second portion.

2. The base of claim 1, wherein the nonmechanical attachment structure comprises an adhesive.

3. The base of claim 2, wherein the adhesive protrudes from the second portion.

4. The base of claim 2, wherein the adhesive further comprises a liner.

5. The base of claim 2, wherein the adhesive is a removable pressure sensitive adhesive comprising; an inner portion attached to the second portion, and an outer portion releasably attached to the inner portion.

6. The base of claim 2, further comprising a second adhesive.

7. The base of claim 1, further comprising a retainer having a flat surface and a convex surface opposite the flat surface, the retainer being disposed in the concave recess with the convex surface adjacent the concave recess.

8. The base of claim 1, wherein the first portion includes an outwardly curved surface opposite the planar surface, and the second portion includes an inwardly curved surface opposite the nonmechanical attachment structure, the outwardly curved surface being received by the inwardly curved surface.

9. The base of claim 8, wherein the outwardly curved surface is swivelably mounted to the inwardly curved surface.

10. The base of claim 1, wherein the first portion is adapted to removably mount the laser generating device or the leveling device by one of a magnet, a magnetically attractive material, a hook fastener, a loop fastener, a tab, a slot, a flat surface, and a latch.

11. A light generating device with a base, comprising:
base comprising:
a first portion having a first planar surface at least partially surrounded by a rim, the rim having a pocket disposed therein, and a concave recess disposed in the planar surface; and
a second portion attached to the first portion, the second portion having a nonmechanical attachment structure opposite the first portion;
wherein the light generating device is removably mounted to the first portion along the first planar surface, at least a portion of the light generating device being disposed in the pocket, and the first portion is both pivotable and rotatable relative to the second portion.

12. The device of claim 11, wherein the light generating device generates a laser beam.

13. The device of claim 12, wherein the light generating device generates the laser beam with an asymmetric intensity.

14. The device of claim 11, wherein the light generating device generates light in the shape of a fan.

15. The device of claim 14, wherein the light generating device comprises a housing with at least one flat surface and the fan substantially lies within a second plane that intersects a plane defined by the at least one flat surface at an angle.

16. The device of claim 11, wherein the light generating device further comprises a retractable pin and an actuator for the pin.

17. The device of claim 11, wherein the noninechanical attachment structure is an adhesive.

18. The device of claim 11, wherein the light generating device is removably mounted to the first portion with one of a hook fastener, a loop fastener, a tab, a slot, a flat surface, and a latch.

19. The device of claim 11, wherein the light generating device includes a latch.

20. The device of claim 11, wherein the first portion includes a latch.

21. The device of claim 11, wherein the first portion includes a magnet or a material that is magnetically attractive to a magnet.

22. A leveling device with a base, comprising:
   the base comprising:
      a first portion having a first planar surface at least partially surrounded by a rim, the rim having a pocket disposed therein, and a concave recess disposed in the planar surface; and
      a second portion attached to the first portion, the second portion having a nonmechanical attachment structure opposite the first portion;
   wherein the leveling generating device removably mounted to the first portion along the first planar surface, at least a portion of the light generating device being disposed in the pocket, and the first portion is both pivotable and rotatable relative to the second portion.

23. The device of claim 22, wherein the leveling device further comprises a retractable pin and an actuator for the pin.

24. The device of claim 22, wherein the nonmechanical attachment structure is an adhesive.

25. The device of claim 22, wherein the leveling device is removably mounted to the first portion by one of a magnet, a magnetically attractive material, a hook fastener, a loop fastener, a tab, a slot, a flat surface, and a latch.

26. The device of claim 22, wherein the leveling device includes a latch.

27. The device of claim 22, wherein the first portion includes a magnet or a material that is magnetically attracted to a magnet.

28. A movable base for a light generating device or a leveling device, comprising:
   a first portion having a planar surface at least partially surrounded by a rim having a pocket, and a concave recess disposed in the planar surface, the planar surface being adapted to removably receive and mount either a light generating device or a leveling device thereto; and
   a second portion mounted to the first portion, the second portion including a nonmechanical attachment structure opposite the first portion,
   wherein the second portion is attached to the first portion opposite the light generating device or leveling device and the first portion is both pivotable and rotatable relative to the second portion.

29. The base of claim 28, wherein the first portion includes a material that is magnetically attracted to the light generating device or leveling device being mounted to the first portion.

30. The base of claim 28, wherein the first portion includes a curved inner surface and the second portion includes a curved outer surface that receives the curved inner surface of the first portion when the first and second portions are attached to one another.

31. The base of claim 28, further comprising a retainer and a fastener for joining the first and second portions.

32. The base of claim 28, wherein the nonmechanical attachment structure comprises an adhesive.

33. The base of claim 32, wherein the adhesive is a removable pressure-sensitive adhesive.

34. The base of claim 32, wherein the adhesive protrudes from the second portion.

35. The base of claim 32, wherein the adhesive further comprises a liner.

36. The base of claim 28, wherein the first portion includes one of a magnet, a magnetically attractive material, a hook fastener, a loop fastener, a tab, a slot, a flat surface, a recess, and a latch.

37. A method of aligning objects on a surface, the method comprising:
   inserting a light generating device into a movable base, the movable base including a first portion having a planar surface at least partially surrounded by a rim having a pocket, and a concave recess disposed in the planar surface, the light generating device being removably mounted to the first portion along the planar surface with a portion of the light generating device being disposed in the pocket, the movable base further including a second portion that includes a nonmechanical attachment structure opposite the first portion, the second portion pivotably and rotatably mounted to the first portion;
   attaching the light generating device and movable base to a wall surface with an adhesive;
   orienting the light generating device in at least one plane using at least one bubble level and a movable feature on the light generating device; and
   aligning at least one object on the wall surface.

38. The method of claim 37, wherein the adhesive is a removable pressure sensitive adhesive.

39. The method of claim 38, further comprising removing the light generating device and the movable base from the wall surface and discarding the adhesive.

40. A method of aligning objects on a surface, the method comprising:
   inserting a leveling device into a movable base, the movable base including a first portion having a planar surface at least partially surrounded by a rim having a pocket, and a concave recess disposed in the planar surface, the leveling device being removably mounted to the first portion along the planar surface with a portion of the light generating device being disposed in the pocket, the movable base further including a second portion that includes a nonmechanical attachment structure opposite the first portion, the second portion pivotably and rotatably mounted to the first portion;
   attaching the leveling device and movable base to a wall surface with an adhesive;
   orienting the leveling device in at least one plane using at least one bubble level and a movable feature on the leveling device; and
   aligning at least one object on the wall surface.

41. The method of claim 40, wherein the adhesive is a removable pressure sensitive adhesive.

42. The method of claim 40, further comprising removing the leveling device and the movable base from the wall surface and discarding the adhesive.

43. A kit for a light generating device, comprising:
   a container defining a volume of space;
   a base positioned within the volume of space, the base comprising:
      a first portion having a planar surface at least partially surround by a rim having a pocket, and a concave recess disposed in the planar surface;

a second portion attached to the first portion, the second portion including a nonmechanical attachment structure opposite the first portion and, the second portion pivotably and rotatably attached to the first portion; and a light generating device positioned within the volume of space so as to be unattached to the base, wherein the planar surface is adapted to removably mount the light generating device to the first portion, such that a portion of the light generating device is disposed in the pocket.

44. The kit of claim 43, wherein the light generating device generates a laser beam.

45. The kit of claim 44, wherein the light generating device generates the laser beam with an asymmetric intensity.

46. The kit of claim 43, wherein the light generating device generates light in the shape of a fan.

47. The kit of claim 46, wherein the light generating device comprises a housing with at least one flat surface and the fan substantially lies within a second plane that intersects a plane defined by the flat surface at an angle.

48. The kit of claim 43, wherein the light generating device further comprises a retractable pin and an actuator for the pin.

49. The kit of claim 43, wherein the nonmechanical attachment structure is an adhesive.

50. The kit of claim 43, wherein the light generating device is removably mounted to the first portion with one of a hook fastener, a loop fastener, a tab, a slot, a flat surface, and a latch.

51. The kit of claim 43, wherein the light generating device comprises a latch that engages the first portion.

52. The kit of claim 43, wherein the planar surface includes a magnet.

53. The kit of claim 43, wherein the planar surface includes a material that is magnetically attracted to the light generating device.

54. A kit for a leveling device, comprising:

a container defining a volume of space;

a base positioned within the volume of space, the base comprising:

a first portion including a planar surface at least partially surrounded by a rim having a pocket, and a concave recess disposed in the planar surface; and a second portion pivotably and rotatably attached to the first portion, the second portion including a nonmechanical attachment structure opposite the first portion; and a leveling device positioned within the volume of space so as to be unattached to the base, wherein the planar surface is adapted to removably mount the leveling device to the first portion, such that a portion of the leveling device is disposed in the pocket.

55. The kit of claim 54, wherein the leveling device further comprises a retractable pin and an actuator for the pin.

56. The kit of claim 54, wherein the nonmechanical attachment structure is an adhesive.

57. The kit of claim 54, wherein the leveling device is removably mounted to the first portion with one of a magnet, a magnetically attractive material, a hook fastener, a loop fastener, a tab, a slot, a flat surface, and a latch.

58. The kit of claim 54, wherein the leveling device includes a latch.

59. The kit of claim 54, wherein the leveling device further comprises an automatic leveler selected from the group consisting of a pendulum, a cantilevered tilt mechanism, an electronic leveler, and a shaft held between journals.

* * * * *

UNITED STATES PATENT AND TRADEMARK OFFICE
CERTIFICATE OF CORRECTION

PATENT NO. : 7,278,218 B2
APPLICATION NO. : 10/612035
DATED : October 9, 2007
INVENTOR(S) : Steven R. Levine It is certified that error appears in the above-identified patent and that said Letters Patent is hereby corrected as shown below:

In the Claims:

At Column 12, line 66, "noninechanical" should be -- nonmechanical--.

At Column 13, line 21, "device removably" should be -- device is removably --.

At Column 14, line 66, "surround" should be -- surrounded --.

Signed and Sealed this

Twentieth Day of May, 2008

JON W. DUDAS
*Director of the United States Patent and Trademark Office*